United States Patent
Hanke et al.

(10) Patent No.: US 10,871,977 B2
(45) Date of Patent: Dec. 22, 2020

(54) AUTOMATED SOFTWARE SCRIPT REMEDIATION METHODS AND SYSTEMS

(71) Applicant: Ernst & Young U.S. LLP, New York, NY (US)

(72) Inventors: Justin Hanke, Cary, NC (US); Vikraman Narasimhan, Bangalore (IN)

(73) Assignees: Ernst & Young U.S. LLP, New York, NY (US); Ernst & Young LLP, Kolkata (IN)

( * ) Notice: Subject to any disclaimer, the term of this patent is extended or adjusted under 35 U.S.C. 154(b) by 0 days.

(21) Appl. No.: 16/116,642

(22) Filed: Aug. 29, 2018

(65) Prior Publication Data

US 2020/0073686 A1     Mar. 5, 2020

(51) Int. Cl.
  G06F 9/455 (2018.01)
  G06F 16/95 (2019.01)
  G06F 8/38 (2018.01)
  G06F 11/36 (2006.01)
  G06K 9/62 (2006.01)

(52) U.S. Cl.
  CPC ............ G06F 9/45512 (2013.01); G06F 8/38 (2013.01); G06F 11/3688 (2013.01); G06F 16/95 (2019.01); G06K 9/6215 (2013.01)

(58) Field of Classification Search
  CPC ........ G06F 8/38; G06F 9/45512; G06F 11/36; G06F 11/3664; G06F 11/3668; G06F 11/3672; G06F 11/368; G06F 11/3684; G06F 11/3688; G06F 11/3696; G06F 16/95; G06K 9/6215
  USPC .......................................... 717/115, 124–126
  See application file for complete search history.

(56) References Cited

U.S. PATENT DOCUMENTS

| | | |
|---|---|---|
| 5,941,944 A | 8/1999 | Messerly |
| 6,536,037 B1 | 3/2003 | Guheen et al. |
| 7,490,319 B2 | 2/2009 | Blackwell et al. |
| 7,900,192 B2 * | 3/2011 | Patterson ............. G06F 11/368 717/125 |

(Continued)

FOREIGN PATENT DOCUMENTS

WO    WO 2002/015023     2/2002

OTHER PUBLICATIONS

C. Soh, H. B. K. Tan, Y. L. Arnatovich and L. Wang, "Detecting Clones in Android Applications through Analyzing User Interfaces," 2015 IEEE 23rd International Conference on Program Comprehension, Florence, 2015, pp. 163-173, doi: 10.1109/ICPC.2015.25. (Year: 2015).*

(Continued)

*Primary Examiner* — Andrew M. Lyons
(74) *Attorney, Agent, or Firm* — Cooley LLP

(57) ABSTRACT

A method for real-time remediation of a software script includes, during execution of the script, attempting to identify a first user interface (UI) object. In response to failing to identify the first UI object, similarity scores are calculated based on the data of the plurality of UI objects and historical data associated with the first UI object. A second UI object is identified, from the plurality of UI objects, based on the calculated similarity scores. The script and/or an object repository referenced by the script are then automatically modified so that subsequent execution of the script includes attempting to identify the second UI object instead of the first UI object.

27 Claims, 4 Drawing Sheets

(56) References Cited

U.S. PATENT DOCUMENTS

| | | | |
|---|---|---|---|
| 8,060,864 B1 | 11/2011 | Michelsen | |
| 8,706,762 B1* | 4/2014 | Patzer | G06F 17/2258 707/790 |
| 8,799,866 B2 | 8/2014 | Bullard et al. | |
| 9,075,918 B1* | 7/2015 | Chandra | G06F 11/3684 |
| 9,207,952 B2* | 12/2015 | Chiantera | G06F 9/451 |
| 9,329,842 B1* | 5/2016 | Chan | G06F 11/368 |
| 9,477,581 B2 | 10/2016 | Hudgons et al. | |
| 9,659,103 B2 | 5/2017 | Tsai et al. | |
| 9,922,108 B1* | 3/2018 | Meiklejohn | G06F 16/258 |
| 2004/0194065 A1* | 9/2004 | McGrath | G06F 9/44 717/124 |
| 2004/0216084 A1 | 10/2004 | Brown et al. | |
| 2006/0117055 A1 | 6/2006 | Doyle | |
| 2007/0011650 A1 | 1/2007 | Hage et al. | |
| 2007/0112764 A1* | 5/2007 | Yih | G06F 16/313 |
| 2008/0244523 A1 | 10/2008 | Kelso | |
| 2009/0217100 A1* | 8/2009 | Grechanik | G06F 11/368 714/38.1 |
| 2009/0217182 A1* | 8/2009 | Grechanik | G06F 8/38 715/762 |
| 2009/0217250 A1* | 8/2009 | Grechanik | G06F 8/36 717/136 |
| 2009/0217302 A1* | 8/2009 | Grechanik | G06F 8/70 719/320 |
| 2009/0217303 A1* | 8/2009 | Grechanik | G06F 8/38 719/320 |
| 2009/0217309 A1* | 8/2009 | Grechanik | G06F 8/38 719/328 |
| 2010/0281457 A1* | 11/2010 | Ren | G06F 9/451 717/105 |
| 2011/0131551 A1* | 6/2011 | Amichai | G06F 11/3668 717/125 |
| 2011/0138357 A1* | 6/2011 | Mishra | G06F 11/3696 717/124 |
| 2012/0023485 A1* | 1/2012 | Dubey | G06F 8/30 717/125 |
| 2012/0324428 A1 | 12/2012 | Ryan et al. | |
| 2013/0091118 A1 | 4/2013 | Ajoku et al. | |
| 2013/0275577 A1 | 10/2013 | Lim | |
| 2014/0229869 A1* | 8/2014 | Chiantera | G06F 9/451 715/763 |
| 2015/0339213 A1* | 11/2015 | Lee | G06F 3/0484 717/125 |
| 2017/0031808 A1* | 2/2017 | Gillaspie | G06F 11/3692 |
| 2017/0046235 A1 | 2/2017 | Straub et al. | |
| 2017/0090734 A1 | 3/2017 | Fitzpatrick | |
| 2017/0249196 A1* | 8/2017 | Zacks | G06F 9/547 |
| 2017/0286804 A1* | 10/2017 | McCann | G06F 16/22 |
| 2018/0052666 A1* | 2/2018 | Zhang | G06F 11/3668 |
| 2018/0081994 A1 | 3/2018 | Ron et al. | |
| 2018/0165179 A1* | 6/2018 | Negi | G06F 11/3672 |
| 2018/0165264 A1* | 6/2018 | Venkataraman | G06N 20/00 |
| 2018/0210824 A1 | 7/2018 | Kochura et al. | |
| 2018/0260310 A1* | 9/2018 | Vorganti | G06F 11/3684 |
| 2018/0307589 A1* | 10/2018 | Falkenberg | G06F 11/3668 |
| 2019/0332849 A1* | 10/2019 | Gupta | G06K 9/00275 |

OTHER PUBLICATIONS

N. Chang, L. Wang, Y. Pei, S. K. Mondal and X. Li, "Change-Based Test Script Maintenance for Android Apps," 2018 IEEE International Conference on Software Quality, Reliability and Security (QRS), Lisbon, 2018, pp. 215-225, doi: 10.1109/QRS.2018.00035. (Year: 2018).*

Z. Gao, Z. Chen, Y. Zou and A. M. Merron, "SITAR: GUI Test Script Repair," in IEEE Transactions on Software Engineering, vol. 42, No. 2, pp. 170-186, Feb. 1, 2016, doi: 10.1109/TSE.2015.2454510. (Year: 2016).*

M. Grechanik, C. W. Mao, A. Baisal, D. Rosenblum and B. M. M. Hossain, "Differencing Graphical User Interfaces," 2018 IEEE International Conference on Software Quality, Reliability and Security (QRS), Lisbon, 2018, pp. 203-214, doi: 10.1109/QRS.2018.00034. (Year: 2018).*

IP.com, "Method for updating changed graphic user interface (GUI) objects in the test script automatically," Sep. 14, 2011, last retrieved from https://ip.com/IPCOM/000210885 on Aug. 15, 2020. (Year: 2011).*

J. Mao, J. Bian, H. Ma, Y. Jia, Z. Liang and X. Jiang, "Robust Detection of Android UI Similarity," 2018 IEEE International Conference on Communications (ICC), Kansas City, MO, 2018, pp. 1-6, doi: 10.1109/ICC.2018.8422189. (Year: 2018).*

Z. Yu, P. Xiao, Y. Wu, B. Liu and L. Wu, "A Novel Automated GUI Testing Technology Based on Image Recognition," 2016 IEEE 18th Int'l Conf on High Performance Computing and Comm's; IEEE 14th Int'l Conf on Smart City; IEEE 2nd Int'l Conf on Data Science and Systems, Sydney, NSW, 2016, pp. 144-149. (Year: 2016).*

Chevalier, A. et al., "Web site designs: Influences of designer's expertise and design constraints," Computer Science, International Journal of Human-Computer Studies, vol. 58, Issue 1, Jan. 2003, pp. 57-87.

International Search Report and Written Opinion for International Application No. PCT/US2019/048478, dated Nov. 29, 2019, 10 pages.

* cited by examiner

AUTOMATED SOFTWARE SCRIPT REMEDIATION METHODS AND SYSTEMS

TECHNICAL FIELD

The present disclosure generally relates to computerized methods for the automated testing of software applications or robotics process automation (RPA).

BACKGROUND

Some aspects of computer software testing are automated, and such aspects are typically implemented in combination with manual testing.

SUMMARY

In some embodiments, a method for real-time remediation of a software script includes attempting to identify a first user interface (UI) object during execution of the script. In response to failing to identify the first UI object, similarity scores are calculated based on the data of the plurality of UI objects and historical data associated with the first UI object. A second UI object is identified, from the plurality of UI objects, based on the calculated similarity scores. Each similarity score of the calculated similarity scores can be uniquely associated with an associated UI object from the plurality of UI objects. The identifying the second UI object can be based, for example, on the second UI object having an associated calculated similarity score that is a highest calculated similarity score of the calculated similarity scores. The script and/or an object repository referenced by the script are then automatically modified so that subsequent execution of the script includes attempting to identify the second UI object instead of the first UI object. Automatically modifying the script can include replacing a representation of the first UI object with a representation of the second UI object. Calculating the similarity scores can be performed according to a predetermined, configurable protocol.

In some embodiments, the script is a test automation script, a robotics process automation script, or any other process that identifies UI objects based on their properties.

In some embodiments, the execution of the script is performed on a second version of a web page, the second version of the web page being different from an earlier, first version of the web page. The plurality of UI objects is included in the second version of the web page, and the first UI object is included in the first version of the web page.

In some embodiments, the execution of the script is performed on a second version of a web page, the second version of the web page being different from an earlier, first version of the web page. The plurality of UI objects is included in the second version of the web page, and the historical data is further associated with the first version of the web page.

In some embodiments, a method for real-time remediation of a software script includes attempting to identify a first UI object, a representation of the first UI object stored in a repository and referenced by the script, during execution of the script. In response to failing to identify first UI object, similarity scores are calculated (e.g., according to a predetermined formula) based on data of a plurality of UI objects and historical data associated with the first UI object. A second UI object, from the plurality of UI objects, is identified as having a highest similarity score of the calculated similarity scores. The stored representation of the first UI object is then automatically modified to produce a modified object representation, such that subsequent execution of the script includes attempting to identify the second UI object in lieu of the first UI object.

In some embodiments, calculating the similarity scores is performed using one of edit distance, Cosine similarity, semantic-based similarity, or a machine learning model that predicts similarity based on object features.

In some embodiments, a non-transitory processor-readable medium stores code representing instructions to be executed by a processor. The code includes code to cause the processor to attempt to identify a first UI object using data properties of that UI object. The code includes code to cause the processor to calculate similarity scores based on data of a plurality of UI objects and historical data associated with the first UI object, in response to failing to identify the UI object. The code includes code to cause the processor to identify a second UI object, from the plurality of UI objects, having a highest similarity score of the calculated similarity scores, and to automatically modify the script and/or an identifier of the first UI object that is referenced by the script, such that execution of the script subsequent to the automatic modification includes attempting to identify the second UI object in lieu of the first UI object.

DETAILED DESCRIPTION

Figure 1:
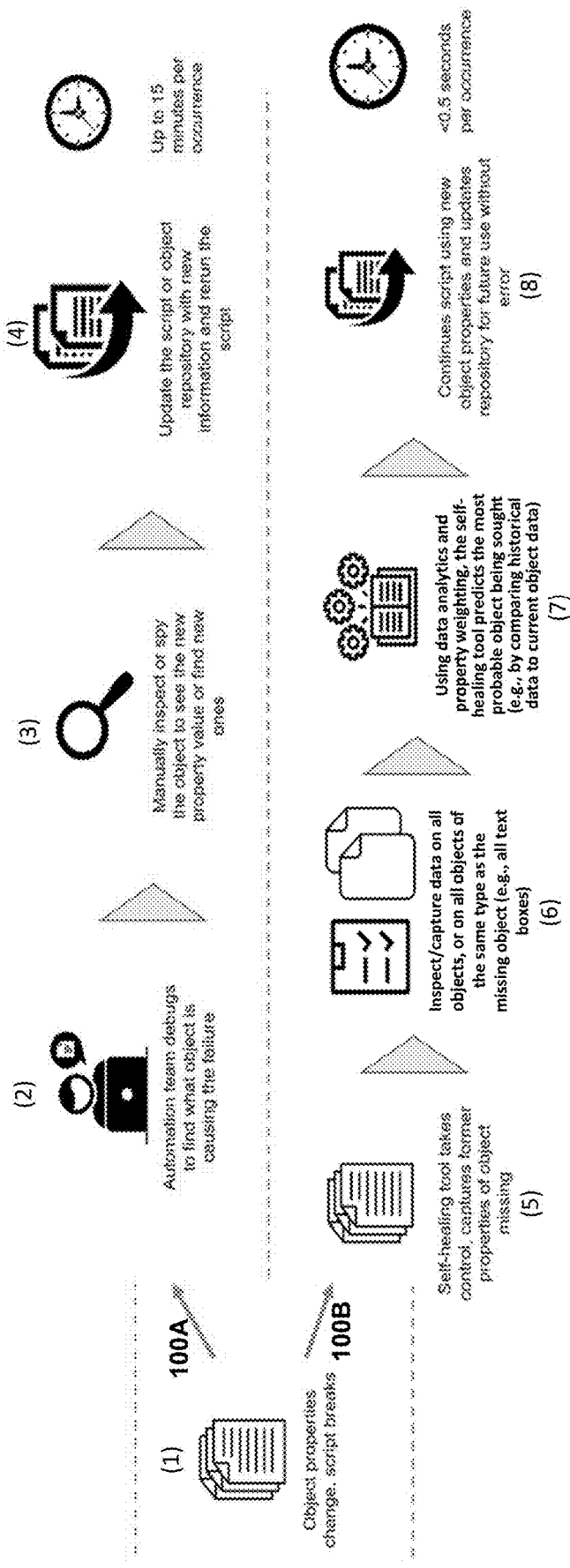
FIG. 1 is a flowchart showing example differences between known manual methods of script modification, and self-healing embodiments of the present disclosure.

In known implementations of automation scripts (e.g., in software testing), issues with the identification of objects (e.g., text boxes, buttons, links, and/or the like), such as web objects, are a significant cause of inefficiency and maintenance downtime. Some automation scripts attempt to use wildcards or other devices to accommodate frequent object changes, but such methods are often ineffective. According to known methods, as shown in FIG. 1 (upper path 100A, steps 1-4), when an automation script "breaks" (e.g., is interrupted due to a failure, for example, to identify an object specified by the script), an automation team debugs the script to identify which object has caused the failure. An operator then manually inspects the test subject to look for the object that the script failed to identify, and either observes its current properties or determines an appropriate property value to use. The operator then manually updates the script (or an object repository) with the current properties or newly-determined property value, and re-runs the script. As such, known methods of addressing automation script failures are manual, involve an interruption in service, and can involve substantial delays.

Embodiments of the present disclosure directly and automatically solve the foregoing issues without user intervention. More specifically, systems and methods of the present disclosure can use data analytics to identify objects that are most similar to another object. For example, in the context of web page testing, a test automation script may fail to identify/locate one or more web objects specified within the test automation script when analyzing a subject web page being tested. The failure may occur, for example, because properties of the one or more web objects have been changed as part of the modification of a previous version of the web page to create the "new" version of the web page that is currently being tested. According to some embodiments, the available web objects on the second web page are analyzed to find the object that is most similar to the object that changed, and a modification is made, to the automation script itself and/or to a value referenced by the automation script (e.g., stored in a database, spreadsheet, or other repository), such that the automation script attempts to continue running by making reference to the newly-identified, similar web object.

In some implementations, "historical" objects and/or data about their associated properties are stored (e.g., in a database, spreadsheet, or other repository). The historical objects can include, but are not limited to: web objects such as text boxes, buttons, and/or images. Properties of historical web objects can include, but are not limited to: size, location, name, and text label(s). By comparing objects under test (e.g., web objects on a current version of a web page) to the historical objects, for example based on one or more of their stored data values, a similarity score can be calculated. The objects under test can be analyzed according to one or more algorithms, and/or via "web scraping" (i.e., the automated gathering/collection of web objects and all their properties from a web page, for example by a web crawler or internet bot), and similarity scores can be calculated for each of the identified objects.

In some embodiments, once the similarity scores have been calculated, a "most similar" object, having the highest calculated similarity score, is provided as an output, for use in modifying the automation script and/or a repository referenced by the automation script. The historical data for the original object being compared can then be updated with one or more properties of the "most similar" object.

In other embodiments, once the similarity scores have been calculated, a "replacement" object may be selected based on the calculated similarity scores, while not necessarily constituting the object with the highest similarity score. For example, an object having the second-highest, third-highest, fourth-highest, fifth-highest similarity score can be deemed the "replacement" object, and provided as an output for use in modifying the automation script and/or a repository referenced by the automation script. The historical data for the original object being compared can then be updated with one or more properties of the "replacement" object. By way of example, "replacement" objects (instead of "most similar" objects) may be selected in cases where a "most similar" object was previously identified and used to modify the automation script and/or repository, and where a subsequent attempt by the automation script to identify the "most similar" object failed.

Advantages of the systems and methods set forth herein can include increased script efficiency, reduced automation script maintenance and associated time delays, and improved flexibility and longevity of automated scripts.

Self-Healing Object Identification—Overview

As used herein, a "self-healing tool" includes one or more hardware modules and/or software modules that are stored on and/or executed by hardware, for automatically remediating a script. Hardware modules may include, for example, a general-purpose processor, a field programmable gate array (FPGA), and/or an application specific integrated circuit (ASIC). Software modules (executed on hardware or stored in memory) can be expressed in a variety of software languages (e.g., computer code), including C, C++, Java™, Ruby, Visual Basic™, and/or other object-oriented, procedural, or other programming language and development tools.

FIG. 1 is a flowchart showing example differences between known manual methods of script modification (upper path 100A, steps 1-4, discussed above), and self-healing embodiments of the present disclosure. According to an example method of the present disclosure (lower path 100B, steps 1 and 5-8 in FIG. 1), when an automation script "breaks" (e.g., is interrupted due to a failure, for example, to identify an object specified by the script because the object has changed), the object that cannot be identified may be referred to as a "missing object." At step (5), a self-healing tool takes control by first capturing (e.g., saving to memory) the former properties of the missing object, for example as represented by the portion of the script that relates to the missing object. At step (6), the self-healing tool inspects and captures data associated with all current objects (e.g., from one or more objects in a present environment/application being tested/analyzed by the script) having the same object "type" as the missing objects. The inspection and capture of the current object data can be accomplished, for example, using a "web scraping" process (also referred to as web data extraction, screen scraping, or web harvesting), for example when the environment/application being tested is a website). As used herein, an "object type" can include, but is not limited to, a software component such as a control element. A control element can be a graphical user interface (GUI) widget, such as a text box, combo box, icon, label, button (e.g., radio button, check box, split button, cycle button), slider, list box, spinner, drop-down list, menu (e.g., context menu, pie menu), menu bar, toolbar, ribbon, tree view, grid view/datagrid, link, tab, scrollbar, tooltip, balloon help, status bar, progress bar, infobar, window, panel (e.g., collapsible panel), accordion, modal window, dialog box, dialog window, frame, canvas, cover flow, bubble flow, and/or the like.

At step (7), the self-healing tool predicts, using data analytics and property weighting, a "most probable" object, from the current objects, being sought by the script and/or identified as the source for the interruption/breaking of the automation script. In some implementations, the property weighting performed by the self-healing tool is customizable (e.g., based on a desired application) by an operator of the self-healing tool, prior to running the self-healing tool. Based on the prediction at step (7), the script continues to operate (at step (8)) using properties of the predicted "most probable" object (also referred to as "new object properties"), and a repository in which object properties are stored can be updated for future reference to prevent further errors. As shown in FIG. 1, the method 100B of the present disclosure can take significantly less time than the known method 100A (e.g., about 0.01 to about 0.2 seconds per occurrence instead of up to 15 minutes per occurrence, where an "occurrence" can refer to the process spanning from (1) to (8) along path 100B in FIG. 1), and can be implemented without the need to interrupt and re-run the script. Table 1, below, provides an example overview of time elapsed for a sample implementation of the self-healing tool:

TABLE 1

Example Self-Healing Tool Performance

| No of objects | Properties per Object | Time Elapsed (seconds) |
|---|---|---|
| 12 | 10 | 0.2 |

Figure 2:
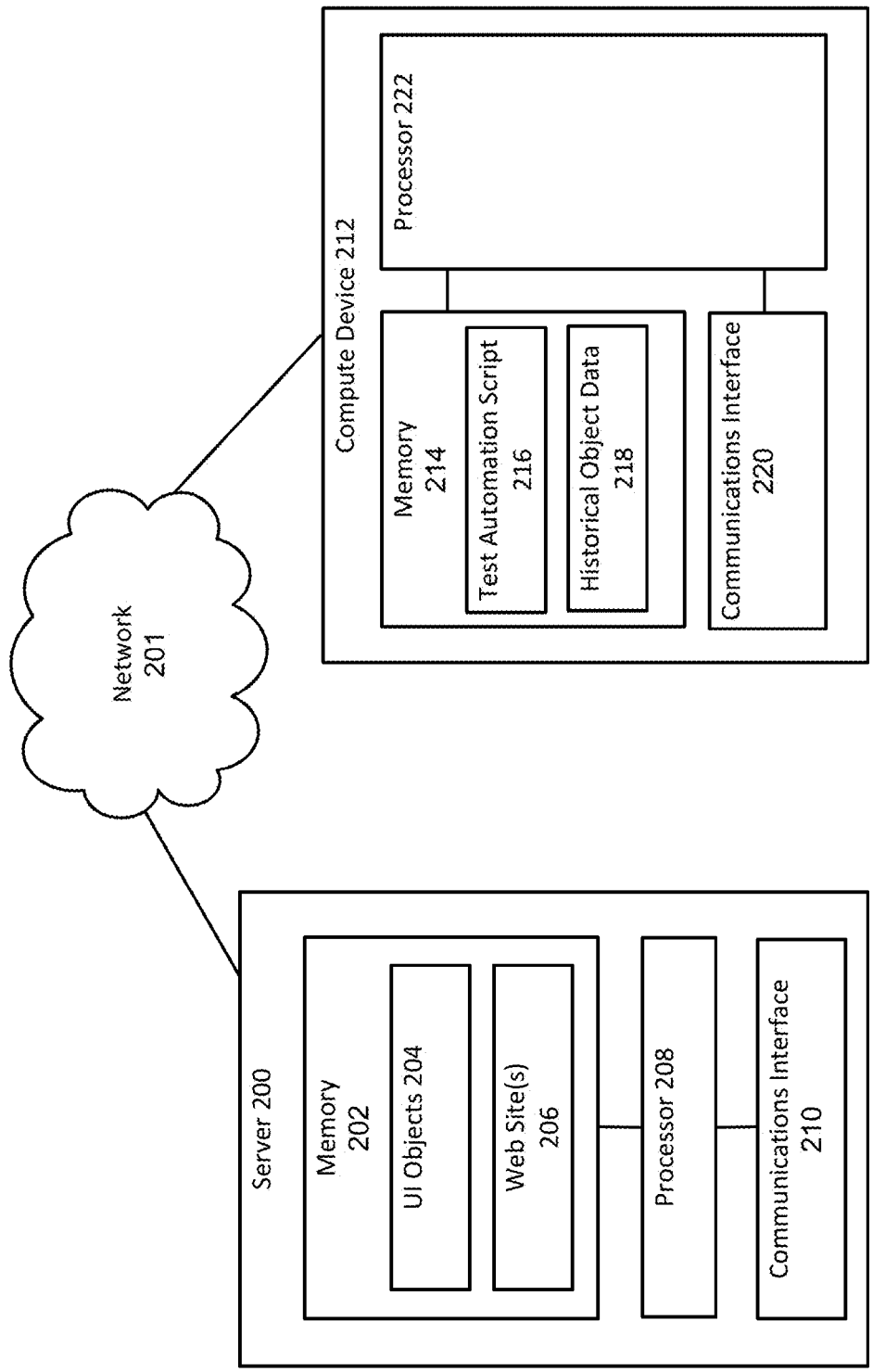
FIG. 2 is a system block diagram showing components of a system for automated script remediation, according to some embodiments.

FIG. 2 is a system block diagram showing components of a system for automated script remediation, according to some embodiments. The system of FIG. 2 can be used, for example, to implement the method 100B of FIG. 1. As shown in FIG. 2, a server 200 includes a memory 202 in operable communication with a processor 208 and a communications interface 210. The memory 202 stores data associated with user interface (UI) objects 204 and data associated with web site(s) 206. The server 200 is in communication, via a network 201 (e.g., a wireless network or a wired network), with one or more compute devices 212. A compute device 212 includes a processor 222 in operable communication with a memory 214 and a communications interface 220. The memory 214 stores a test automation script 216 and historical object data 218. The historical object data 218 can include data for one or more objects (e.g., web objects such as text boxes, buttons, and/or images). Such data can include, but is not limited to: size, location, name, and text label(s). In some implementations, the historical object data 218 includes data that was previously automatically collected, e.g., via web scraping.

Although shown in FIG. 2 to include a test automation script 216 for analyzing/testing data associated with one or more web sites 206, in other implementations a system of the present disclosure can include a robotics process automation (RPA) script for analyzing one or more applications (e.g., RPA process(es)/routine(s)). Example RPA processes/routines include, but are not limited to: typing or other data entry, logging into one or multiple software applications, copying information from one software application to another software application, scanning, reading and/or composing email(s), manipulating spreadsheets, moving data within a software application, document capture, customer on-boarding, etc.

Figure 3:
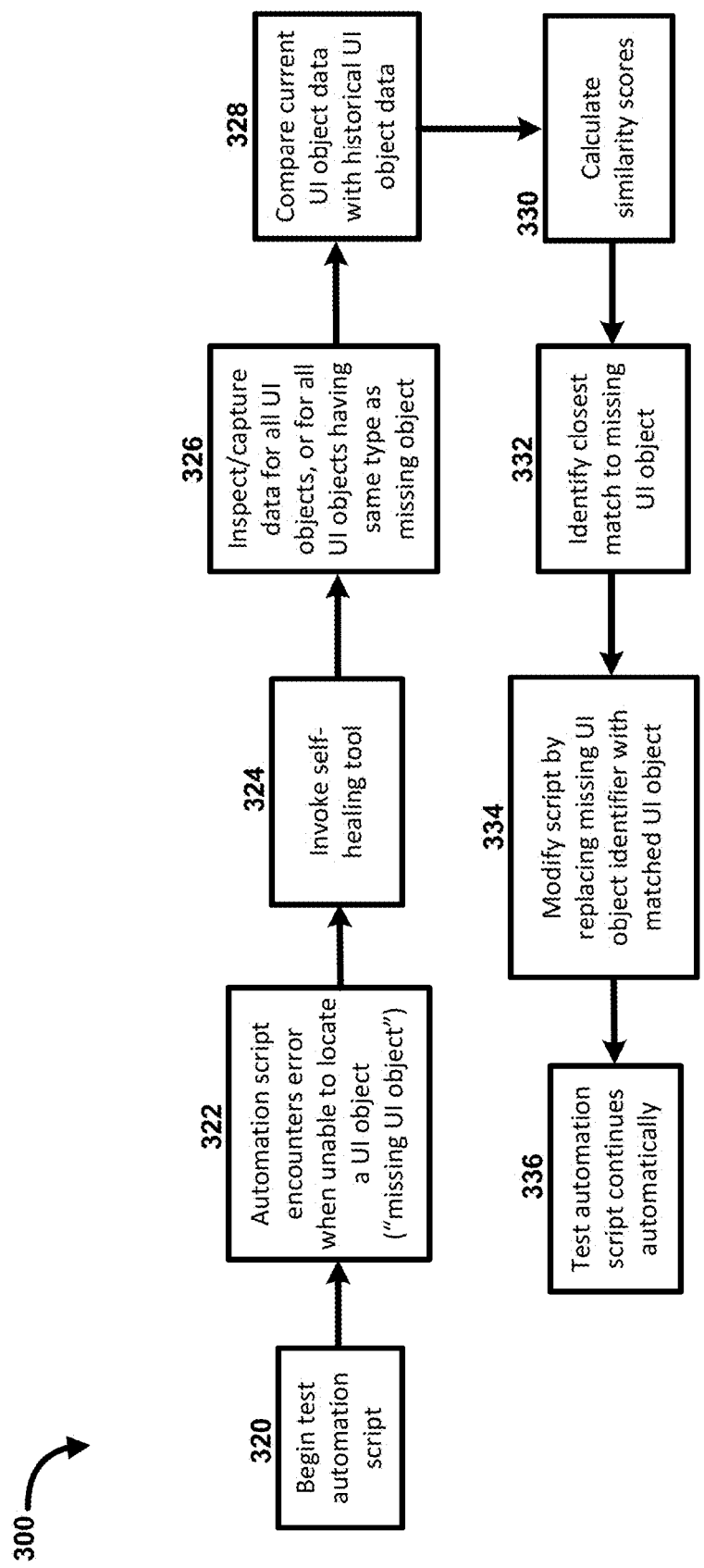
FIG. 3 is a flow diagram illustrating a first method of script remediation, according to some embodiments.

FIG. 3 is a flow diagram illustrating a first method of script remediation (300), according to some embodiments. As shown in FIG. 3, the method 300 begins with the running of a test automation script 320 (e.g., the test automation script 216 of FIG. 2). At 322, the test automation script encounters an error when it is unable to detect/locate a UI object. The UI object that the test automation script cannot detect/locate can be referred to as a missing UI object. At 324, the self-healing tool is invoked. The self-healing tool inspects/captures data (at 326) for all "current" UI objects (i.e., within the environment/application being tested), or for those UI objects of the current UI objects having a same object type as the object type of the missing UI object. The inspection and capture of the current UI object data can be accomplished, for example, using a "web scraping" process (also referred to as web data extraction, screen scraping, or web harvesting), for example when the environment/application being tested is a web site (e.g., the web site(s) 206 of FIG. 2). At 328, the self-healing tool performs comparisons of the captured current UI object data with historical UI object data (e.g., historical object data 218 of FIG. 2), and calculates similarity scores (at 330) based on the comparisons. In some such implementations, a similarity score is calculated for each current UI object of the current UI objects for which data has been captured by the self-healing tool. At 332, the self-healing tool identifies the current UI object that is the "closest match" (e.g., has the highest similarity score of the calculated similarity scores) to the missing UI object. Steps 330 and 332 may be referred to, collectively, as "self-healing analysis." The self-healing tool then modifies the script (at 334) by replacing the missing UI object's representation within the script, with the closest match UI object (also referred to as a "matched UI object" or "replacement UI object"). The test automation script then continues to run automatically (at 336), without the need for a user to "re-run" or manually restart the test automation script.

Although the method 300 of FIG. 3 describes the identification of a "closest match" current UI object at (332) as the current UI object having the highest similarity score of the calculated similarity scores, in other implementations, the "closest match" UI object (whose data is used to modify the script at 334) can instead have a second-highest similarity score, a third-highest similarity score, a fourth-highest similarity score, etc. For example, in some implementations, if continuing to run the test automation script at 336 based on the modified script resulting from (334) results in another error relating to the replacement UI object, the method 300 may iterate for a second time (e.g., by again invoking the self-healing tool at 324 and proceeding as set forth above). In such a scenario, if after calculating the similarity scores at 330 results in the same "replacement UI object" having the highest similarity score, the self-healing tool may elect not to use that UI object again, and instead designate a different current UI object to be the new replacement UI object, based on that current UI object having the second highest similarity score, third highest similarity score, fourth highest similarity score, etc. In other implementations, the method 300 of FIG. 3 may use, at 332 and on the first iteration, a current UI object other than the "closest match" UI object (e.g., the current UI object having the second highest similarity score, the third highest similarity score, the fourth highest similarity score, etc.).

Figure 4:
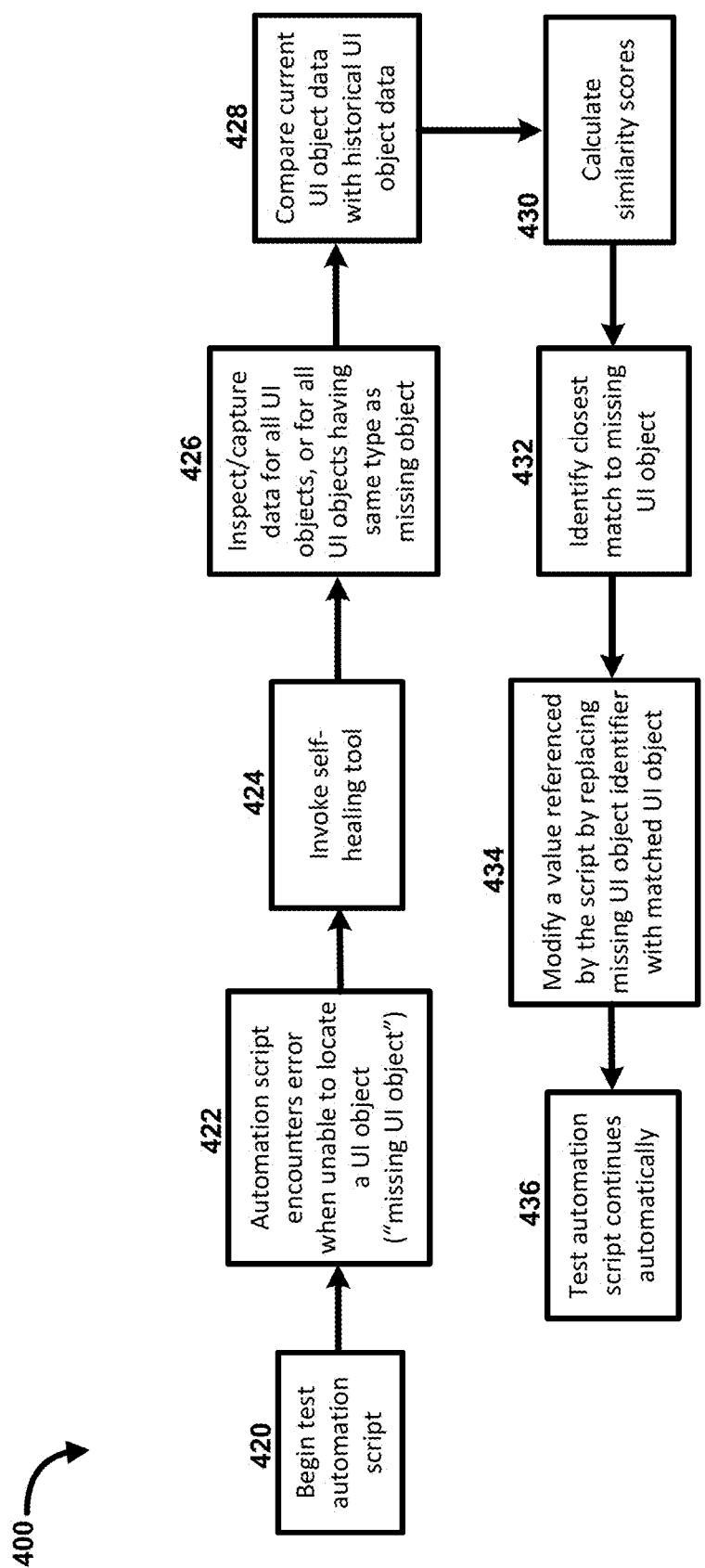
FIG. 4 is a flow diagram illustrating a second method of script remediation, according to some embodiments.

FIG. 4 is a flow diagram illustrating a second method of script remediation (400), according to some embodiments. As shown in FIG. 4, the method 400 begins with the running of a test automation script 420 (e.g., the test automation script 216 of FIG. 2). At 422, the test automation script encounters an error when it is unable to detect/locate a UI object. The UI object that the test automation script cannot detect/locate can be referred to as a missing UI object. At 424, the self-healing tool is invoked. The self-healing tool inspects/captures data (at 426) for all "current" UI objects (i.e., within the environment/application being tested), or for those UI objects of the current UI objects having a same object type as the object type of the missing UI object. The inspection and capture of the current UI object data can be accomplished, for example, using a "web scraping" process (also referred to as web data extraction, screen scraping, or web harvesting), for example when the environment/application being tested is a web site (e.g., the web site(s) 206 of FIG. 2). At 428, the self-healing tool performs comparisons of the captured current UI object data with historical UI object data (e.g., historical object data 218 of FIG. 2), and calculates similarity scores (at 430) based on the comparisons. In some such implementations, a similarity score is calculated for each current UI object of the current UI objects for which data has been captured by the self-healing tool. At 432, the self-healing tool identifies the current UI object that is the "closest match" (e.g., has the highest similarity score of the calculated similarity scores) to the missing UI object. Steps 430 and 432 may be referred to, collectively, as "self-healing analysis." The self-healing tool then modifies a value referenced by the script (at 434) by replacing the missing UI object's representation/identifier within a repository (e.g., a database, spreadsheet, another memory location, etc.) referenced by the script, with the closest match UI object (also referred to as a "matched UI object" or "replacement UI object"). The test automation script then continues to run automatically (at 436), without the need for a user to "re-run" or manually restart the test automation script.

Although the method 400 of FIG. 4 describes the identification of a "closest match" current UI object at (432) as the current UI object having the highest similarity score of the calculated similarity scores, in other implementations, the "closest match" UI object (whose data is used to modify the value referenced by the script at 434) can instead have a second-highest similarity score, a third-highest similarity score, a fourth-highest similarity score, etc. For example, in some implementations, if continuing to run the test automation script at 436 based on the modified value resulting from (434) results in another error relating to the replacement UI object, the method 400 may iterate for a second time (e.g., by again invoking the self-healing tool at 424 and proceeding as set forth above). In such a scenario, if after calculating the similarity scores at 430 results in the same "replacement UI object" having the highest similarity score, the self-healing tool may elect not to use that UI object again, and instead designate a different current UI object to be the new replacement UI object, based on that current UI object having the second highest similarity score, third highest similarity score, fourth highest similarity score, etc. In other implementations, the method 400 of FIG. 4 may use, at 432 and on the first iteration, a current UI object other than the "closest match" UI object (e.g., the current UI object having the second highest similarity score, the third highest similarity score, the fourth highest similarity score, etc.).

An example code snippet for implementing a similarity score calculation, according to one embodiment, is as follows:

```
private HashMap<String, Double>
calculateWeightage(HashMap<String,Integer> resultsMap) {
    HashMap<String, Double> weightedResult =
    new HashMap<String,Double>( );
    try {
        for(String key:resultsMap.keySet( )) {
            String weight = fU.readPropertiesFile("weightage.
            properties", key);
            int weightage = Integer.valueOf(weight);
            double newValue = (resultsMap.get(key).
            doubleValue( ) / 100.0 ) *weightage;
            weightedResult.put(key, newValue);
        }
    }catch(Exception e) {
        e.printStackTrace( );
    }
    return weightedResult;
}
public static double getSimilarityScore(int distance, int length1,
int length2) {
    double percentage = 0.0;
    try {
        if(distance == 0) {
            percentage = 100;
        }else {
            percentage = 1 - (double) distance/ (double)
            Math.max(length 1, length2);
            percentage = percentage * 100;
        }
    }catch(Exception e) {
        e.printStackTrace( );
    }
    return percentage;
}
```

In some embodiments, the self-healing tool includes a software module (e.g., Java®, web application programming interface (API), etc.) that is custom-built, for example using one or more some open-source libraries for a subset of the functions of the self-healing tool. For example, in some implementations, self-healing analysis is performed using one or more of: Selenium WebDriver, JSoup and/or the Levenshtein algorithm (for evaluating text similarity). JSoup is a Java library for working with real-world Hypertext Markup Language (HTML) parser libraries. JSoup can extract and manipulate data stored in HTML documents. WebDriver is a web automation framework that allows a user to execute scripts against different browsers. WebDriver includes a collection of open-source APIs which are used to automate interaction with a web application. In some instances, WebDriver is an object-oriented API. The Levenshtein algorithm can be used to calculate a Levenshtein Distance, which is a measure of the similarity between two text strings. During a Levenshtein-based similarity calculation, a list of objects (with its associated properties) is compared with historical data, and a closest object match is found, based on a distance measurement/value. Once the distance measure is calculated, objects are compared based on their associated weights, which may be customized/provided by the user. In some embodiments, each extracted object property is weighted, such that changes to some object properties impact the similarity score to a different extent than do changes to other object properties.

In some embodiments, functionality for parsing web page source information is implemented using the open-source JSoup library. For example, JSoup can be used to parse the dynamic HTML passed by Selenium WebDriver. JSoup can implement the WHATWG HTML5 specification, and parse HTML to the same Document Object Model (DOM) as current known browsers do. Because many web applications include dynamic content (e.g., JavaScript and angular applications), JSoup may not be able to identify the HTML objects in static form. As such, the dynamic HTML content can be extracted through WebDriver and subsequently parsed using JSoup. In some embodiments, the self-healing tool is implemented with XPath decryption. In some embodiments, alternatively or in addition to the UI objects discussed above, a self-healing tool of the present disclosure can be used in conjunction with the testing/analyzing of images, tables and/or objects within tables.

Example Self-Healing Implementation (Using Excel)

In some embodiments, a test automation script proceeds until an object identification issue/error occurs, in which current object properties do not match the object properties specified in the script. The object associated with the object properties specified in the script can be referred to as a missing object. The self-healing tool is triggered in response to detecting the object identification error. Using JSoup, object data of the current DOM is extracted and stored in an Excel worksheet titled "Object Capture." Each and every element in the environment/application being tested can be processed by the self-healing tool as an object, and is inspected/captured together with multiple associated attributes/properties. For example, each and every element of a web page may be evaluated as an object along with all of its associated attributes. The logical name of the missing object may also be stored in the Object Capture worksheet.

An example repository in which historical object data can be maintained is an Object Repository (or "property file") worksheet. The object data in the Object Capture worksheet can be imported into an "Object Repository" worksheet. The Object Repository can include or be embodied by, e.g., an Excel spreadsheet (an example dataset for which is provided in Tables 2A-2B below) or a database.

TABLE 2A

Example Object Repository - Part 1 of 2

| ID | Logical_name | tagName | absLocation | size | color | alt_text |
|---|---|---|---|---|---|---|
| 1 | Desktop.Desktop.id | a | (215, 0) | (96, 30) | rgb (0, 103, 172) | Desktop |
| 2 | Desktop.Desktop.id | span | (225, 7) | (76, 16) | transparent | Desktop |
| 3 | Desktop.Desktop.id | span | (225, 7) | (56, 16) | transparent | Desktop |
| 4 | Desktop.Desktop.id | span | (0, 0) | (0, 0) | transparent | |
| 5 | Desktop.Desktop.id | span | (225, 7) | (56, 16) | transparent | Desktop |
| 6 | Desktop.Desktop.id | span | (251, 7) | (7, 16) | transparent | k |
| 7 | Desktop.Desktop.id | a | (319, 0) | (95, 30) | transparent | Account |
| 8 | Desktop.Desktop.id | span | (225, 7) | (76, 16) | transparent | Account |
| 9 | Desktop.Desktop.id | span | (225, 7) | (56, 16) | transparent | Account |
| 10 | Desktop.Desktop.id | span | (0, 0) | (0, 0) | transparent | |
| 11 | Desktop.Desktop.id | span | (225, 7) | (56, 16) | transparent | Account |
| 12 | Desktop.Desktop.id | a | (319, 0) | (95, 30) | transparent | Policy |
| 13 | Desktop.Desktop.id | span | (225, 7) | (76, 16) | transparent | Policy |
| 14 | Desktop.Desktop.id | span | (225, 7) | (56, 16) | transparent | Policy |
| 15 | Desktop.Desktop.id | span | (0, 0) | (0, 0) | transparent | |
| 16 | Desktop.Desktop.id | span | (225, 7) | (56, 16) | transparent | Policy |
| 17 | Desktop.Desktop.id | span | (251, 7) | (7, 16) | transparent | P |
| 18 | Desktop.Desktop.id | a | (319, 0) | (95, 30) | transparent | Contact |
| 19 | Desktop.Desktop.id | span | (225, 7) | (76, 16) | transparent | Contact |
| 20 | Desktop.Desktop.id | span | (225, 7) | (56, 16) | transparent | Contact |
| 21 | Desktop.Desktop.id | span | (0, 0) | (0, 0) | transparent | |
| 22 | Desktop.Desktop.id | span | (225, 7) | (56, 16) | transparent | Contact |
| 23 | Desktop.Desktop.id | span | (251, 7) | (7, 16) | transparent | C |
| 24 | Desktop.Desktop.id | a | (319, 0) | (95, 30) | transparent | Search |
| 25 | Desktop.Desktop.id | span | (225, 7) | (76, 16) | transparent | Search |
| 26 | Desktop.Desktop.id | span | (225, 7) | (56, 16) | transparent | Search |
| 27 | Desktop.Desktop.id | span | (0, 0) | (0, 0) | transparent | |
| 28 | Desktop.Desktop.id | span | (225, 7) | (56, 16) | transparent | Search |
| 29 | Desktop.Desktop.id | span | (251, 7) | (7, 16) | transparent | h |
| 30 | Desktop.Desktop.id | a | (319, 0) | (95, 30) | transparent | Team |
| 31 | Desktop.Desktop.id | span | (225, 7) | (76, 16) | transparent | Team |
| 32 | Desktop.Desktop.id | span | (225, 7) | (56, 16) | transparent | Team |
| 33 | Desktop.Desktop.id | span | (0, 0) | (0, 0) | transparent | |
| 34 | Desktop.Desktop.id | span | (225, 7) | (56, 16) | transparent | Team |
| 35 | Desktop.Desktop.id | span | (251, 7) | (7, 16) | transparent | T |
| 36 | Desktop.Desktop.id | a | (319, 0) | (95, 30) | transparent | Administration |
| 37 | Desktop.Desktop.id | span | (225, 7) | (76, 16) | transparent | Administration |
| 38 | Desktop.Desktop.id | span | (225, 7) | (56, 16) | transparent | Administration |
| 39 | Desktop.Desktop.id | span | (0, 0) | (0, 0) | transparent | |
| 40 | Desktop.Desktop.id | span | (225, 7) | (56, 16) | transparent | Administration |
| 41 | Desktop.Desktop.id | a | (1850, 3) | (24, 24) | transparent | |
| 42 | Desktop.Desktop.id | span | (1854, 7) | (16, 16) | transparent | |
| 43 | Desktop.Desktop.id | span | (1854, 7) | (16, 16) | transparent | |
| 44 | Desktop.Desktop.id | span | (1854, 7) | (16, 16) | transparent | |
| 45 | Desktop.Desktop.id | span | (0, 0) | (0, 0) | transparent | |
| 46 | Desktop.Desktop.id | a | (0, 0) | (0, 0) | transparent | |
| 47 | Desktop.Desktop.id | span | (1854, 7) | (16, 16) | transparent | |
| 48 | Desktop.Desktop.id | span | (0, 0) | (0, 0) | transparent | |
| 49 | Desktop.Desktop.id | span | (0, 0) | (0, 0) | transparent | |
| 50 | Desktop.Desktop.id | span | (0, 0) | (0, 0) | transparent | |
| 51 | Desktop.Desktop.id | a | (0, 0) | (0, 0) | transparent | |
| 52 | Desktop.Desktop.id | span | (1854, 7) | (16, 16) | transparent | |
| 53 | Desktop.Desktop.id | span | (0, 0) | (0, 0) | transparent | |
| 54 | Desktop.Desktop.id | span | (0, 0) | (0, 0) | transparent | |
| 55 | Desktop.Desktop.id | span | (0, 0) | (0, 0) | transparent | |

TABLE 2B

Example Object Repository - Part 2 of 2

| ID | classname | innertext | outertext | id |
|---|---|---|---|---|
| 1 | x-btn gw-top-menu-selected x-unselectable x-box-item x-toolbar-item x-btn-gw-top-menu-toolbar-small | | <a tabindex="−1" class="x-btn gw-top-menu-selected x-unselectable x-box-item x-toolbar-item x-btn-gw-top-menu-toolbar-small" id="TabBar:DesktopTab" style="margin: 0px; left: 0px; top: 0px; right: auto;" hidefocus="on" unselectable="on" componentid="TabBar:DesktopTab"><span class="x-btn-wrap x-btn-wrap-gw-top-menu-toolbar-small x-btn-split x-btn-split-right" id="TabBar:DesktopTab-btnWrap" role="presentation" data-ref="btnWrap" unselectable="on"><span class="x-btn-button | TabBar:DesktopTab |

TABLE 2B-continued

Example Object Repository - Part 2 of 2

| ID | classname | innertext | outertext | id |
|---|---|---|---|---|
| | | | x-btn-button-gw-top-menu-toolbar-small x-btn-text x-btn-button-center" id="TabBar:DesktopTab-btnEl" role="presentation" data-ref="btnEl" unselectable="on"><span class="x-btn-icon-el x-btn-icon-el-gw-top-menu-toolbar-small " id="TabBar:DesktopTab-btniconEl" role="presentation" data-ref="btniconEl" unselectable="on"></span><span class="x-btn-inner x-btn-inner-gw-top-menu-toolbar small" id="TabBar:DesktopTab-btninnerEl" data-ref="btninnerEl" unselectable="on">Des<span class="g-underlined">k</span>top</span></span></a> | |
| 2 | x-btn-wrap x-btn-wrap-gw-top-menu-toolbar-small x-btn-split x-btn-split-right | | <span class="x-btn-wrap x-btn-wrap-gw-top-menu-toolbar-small x-btn-split x-btn-split-right" id="TabBar:DesktopTab-btnWrap" role="presentation" data-ref="btnWrap" unselectable="on"><span class="x-btn-button x-btn-button-gw-top-menu-toolbar-small x-btn-text x-btn-button-center " id="TabBar:DesktopTab-btnEl" role="presentation" data-ref="btnEl" unselectable="on"><span class="x-btn-icon-el x-btn-icon-el-gw-top-menu-toolbar-small " id="TabBar:DesktopTab-btniconEl" role="presentation" data-ref="btniconEl" unselectable="on"></span><span class="x-btn-inner x-btn-inner-gw-top-menu-toolbar-small" id="TabBar:DesktopTab-btninnerEl" data-ref="btninnerEl" unselectable="on">Des<span class="g-underlined">k</span>top</span></span> | TabBar:DesktopTab-btnWrap |
| 3 | x-btn-button x-btn-button-gw-top-menu-toolbar-small x-btn-text x-btn-button-center | | <span class="x-btn-button x-btn-button-gw-top-menu-toolbar-small x-btn-text x-btn-button-center " id="TabBar:DesktopTab-btnEl" role="presentation" data-ref="btnEl" unselectable="on"><span class="x-btn-icon-el x-btn-icon-el-gw-top-menu-toolbar-small " id="TabBar:DesktopTab-btniconEl" role="presentation" data-ref="btniconEl" unselectable="on"></span><span class="x-btn-inner x-btn-inner-gw-top-menu-toolbar small" id="TabBar:DesktopTab-btninnerEl" data-ref="btninnerEl" unselectable="on">Des<span class="g-underlined">k</span>top</span></span> | TabBar:DesktopTab-btnEl |
| 4 | x-btn-icon-el x-btn-icon-el-gw-top-menu-toolbar-small | | <span class="x-btn-icon-el x-btn-icon-el-gw-top-menu-toolbar-small " id="TabBar:DesktopTab-btniconEl" role="presentation" data-ref="btniconEl" unselecatble="on"></span> | TabBar:DesktopTab-btniconEl |
| 5 | x-btn-inner x-btn-inner-gw-top-menu-toolbar-small | Destop | <span class="x-btn-inner x-btn-inner-gw-top-menu-toolbar-small" id="TabBar:DesktopTab-btninnerEl" data-ref="btninnerEl" unselectable="on">Des<span class="g-underlined">k</span>top</span> | TabBar:DesktopTab-btninnerEl |
| 6 | g-underlined | k | <span class="g-underlined">k</span> | |
| 7 | x-btn x-unselectable x-box-item x-toolbar-item x-btn-gw-top-menu-toolbar-small | | <a tabindex="−1" class="x-btn x-unselectable x-box-item x-toolbar-item x-btn-gw-top-menu-toolbar-small" id="TabBar:AccountTab" style="margin: 0px; left: 104px; top: 0px; right: auto;" hidefocus="on" unselectable="on" componentid="TabBar:AccountTab"><span class="x-btn-wrap x-btn-wrap-gw-top-menu-toolbar-small x-btn-split x-btn-split-right" id="TabBar:AccountTab-btnWrap" role="presentation" data-ref="btnWrap" unselectable="on"><span class="x-btn-button x-btn-button-gw-top-menu-toolbar-small x-btn-text x-btn-button-center" id="TabBar:AccountTab-btnEl" role="presentation" data-ref="btnEl" unselectable="on"><span class="x-btn-icon-el x-btn-icon-el-gw-top-menu-toolbar-small " id="TabBar:AccountTab-btniconEl" role="presentation" data-ref="btniconEl" unselectable="on"></span><span class="x-btn-inner x-btn-inner-gw-top-menu-toolbar small" id="TabBar:AccountTab-btninnerEl" data-ref="btninnerEl" unselectable="on">Account</span></span></a> | TabBar:AccountTab |
| 8 | x-btn-wrap x-btn-wrap-gw-top-menu-toolbar-small x-btn-spilt x-btn-split-right | | <span class="x-btn-wrap x-btn-wrap-gw-top-menu-toolbar-small x-btn-split x-btn-split-right" id="TabBar:AccountTab-btnWrap" role="presentation" data-ref="btnWrap" unselectable="on"><span class="x-btn-button x-btn-button-gw-top-menu-toolbar-small x-btn-text x-btn-button-center " id="TabBar:AccountTab-btnEl" role="presentation" data-ref="btnEl" unselectable="on"><span class="x-btn-icon-el x-btn-icon-el-gw-top-menu-toolbar-small " id="TabBar:AccountTab-btniconEl" role="presentation" data-ref="btniconEl" unselectable="on"></span><span class="x-btn-inner x-btn-inner-gw-top-menu-toolbar-small" | TabBar:AccountTab-btnWrap |

TABLE 2B-continued

Example Object Repository - Part 2 of 2

| ID | classname | innertext | outertext | id |
|---|---|---|---|---|
| 9 | x-btn-button x-btn-button-gw-top-menu-toolbar-small x-btn-text x-btn-button-center | | id="TabBar:AccountTab-btninnerEl" data-ref="btninnerEl" unselectable="on">Account</span></span></span><br><span class="x-btn-button x-btn-button-gw-top-menu-toolbar-small x-btn-text x-btn-button-center " id="TabBar:AccountTab-btnEl" role="presentation" data-ref="btnEl" unselectable="on"><span class="x-btn-icon-el x-btn-icon-el-gw-top-menu-toolbar-small " id="TabBar:AccountTab-btniconEl" role="presentation" data-ref="btniconEl" unselectable="on"></span><span class="x-btn-inner x-btn-inner-gw-top-menu-toolbar small" id="TabBar:AccountTab-btninnerEl" data-ref="btninnerEl" unselectable="on">Account</span></span> | TabBar:AccountTab-btnEl |
| 10 | x-btn-icon-el x-btn-icon-el-gw-top-menu-toolbar-small | | <span class="x-btn-icon-el x-btn-icon-el-gw-top-menu-toolbar-small " id="TabBar:AccountTab-btniconEl" role="presentation" data-ref="btniconEl" unselecatble="on"></span> | TabBar:AccountTab-btniconEl |
| 11 | x-btn-inner x-btn-inner-gw-top-menu-toolbar-small | Account | <span class="x-btn-inner x-btn-inner-gw-top-menu-toolbar-small" id="TabBar:AccountTab-btninnerEl" data-ref="btninnerEl" unselectable="on">Account</span> | TabBar:AccountTab-btninnerEl |
| 12 | x-btn x-unselectable x-box-item x-toolbar-item x-btn-gw-top-menu-toolbar-small | | <a tabindex="−1" class="x-btn x-unselectable x-box-item x-toolbar-item x-btn-gw-top-menu-toolbar-small" id="TabBar:PolicyTab" style="margin: 0px; left: 207px; top: 0px; right: auto;" hidefocus="on" unselectable="on" componentid="TabBar:PolicyTab"><span class="x-btn-wrap x-btn-wrap-gw-top-menu-toolbar-small x-btn-split x-btn-split-right" id="TabBar:PolicyTab-btnWrap" role="presentation" data-ref="btnWrap" unselectable="on"><span class="x-btn-button x-btn-button-gw-top-menu-toolbar-small x-btn-text x-btn-button-center" id="TabBar:PolicyTab-btnEl" role="presentation" data-ref="btnEl" unselectable="on"><span class="x-btn-icon-el x-btn-icon-el-gw-top-menu-toolbar-small " id="TabBar:PolicyTab-btniconEl" role="presentation" data-ref="btniconEl" unselectable="on"></span><span class="x-btn-inner x-btn-inner-gw-top-menu-toolbar small" id="TabBar:PolicyTab-btninnerEl" data-ref="btninnerEl" unselectable="on"><span class="g-underlined">p</span>olicy</span></span></span></a> | TabBar:PolicyTab |
| 13 | x-btn-wrap x-btn-wrap-gw-top-menu-toolbar-small x-btn-split x-btn-split-right | | <span class="x-btn-wrap x-btn-wrap-gw-top-menu-toolbar-small x-btn-split x-btn-split-right" id="TabBar:PolicyTab-btnWrap" role="presentation" data-ref="btnWrap" unselectable="on"><span class="x-btn-button x-btn-button-gw-top-menu-toolbar-small x-btn-text x-btn-button-center " id="TabBar:PolicyTab-btnEl" role="presentation" data-ref="btnEl" unselectable="on"><span class="x-btn-icon-el x-btn-icon-el-gw-top-menu-toolbar-small " id="TabBar:PolicyTab-btniconEl" role="presentation" data-ref="btniconEl" unselectable="on"></span><span class="x-btn-inner x-btn-inner-gw-top-menu-toolbar-small" id="TabBar:PolicyTab-btninnerEl" data-ref="btninnerEl" unselectable="on"><span class="g-underlined">P</span>olicy</span></span></span> | TabBar:PolicyTab-btnWrap |
| 14 | x-btn-button x-btn-button-gw-top-menu-toolbar-small x-btn-text x-btn-button-center | | <span class="x-btn-button x-btn-button-gw-top-menu-toolbar-small x-btn-text x-btn-button-center " id="TabBar:PolicyTab-btnEl" role="presentation" data-ref="btnEl" unselectable="on"><span class="x-btn-icon-el x-btn-icon-el-gw-top-menu-toolbar-small " id="TabBar:PolicyTab-btniconEl" role="presentation" data-ref="btniconEl" unselectable="on"></span><span class="x-btn-inner x-btn-inner-gw-top-menu-toolbar small" id="TabBar:PolicyTab-btninnerEl" data-ref="btninnerEl" unselectable="on"><span class="g-underlined">P</span>olicy</span></span> | TabBar:PolicyTab-btnEl |
| 15 | x-btn-icon-el x-btn-icon-el-gw-top-menu-toolbar-small | | <span class="x-btn-icon-el x-btn-icon-el-gw-top-menu-toolbar-small " id="TabBar:PolicyTab-btniconEl" role="presentation" data-ref="btniconEl" unselecatble="on"></span> | TabBar:PolicyTab-btniconEl |
| 16 | x-btn-inner x-btn-inner-gw-top-menu-toolbar-small | olicy | <span class="x-btn-inner x-btn-inner-gw-top-menu-toolbar-small" id="TabBar:PolicyTab-btninnerEl" data-ref="btninnerEl" unselectable="on"><span class="g-underlined">P</span>olicy</span> | TabBar:PolicyTab-btninnerEl |

TABLE 2B-continued

Example Object Repository - Part 2 of 2

| ID | classname | innertext | outertext | id |
|----|-----------|-----------|-----------|-----|
| 17 | g-underlined | P | <span class="g-underlined">P</span> | |
| 18 | x-btn x-unselectable x-box-item x-toolbar-item x-btn-gw-top-menu-toolbar-small | | <a tabindex="−1" class="x-btn x-unselectable x-box-item x-toolbar-item x-btn-gw-top-menu-toolbar-small" id="TabBar:ContactTab" style="margin: 0px; left: 297px; top: 0px; right: auto;" hidefocus="on" unselectable="on" componentid="TabBar:ContactTab"><span class="x-btn-wrap x-btn-wrap-gw-top-menu-toolbar-small x-btn-split x-btn-split-right" id="TabBar:ContactTab-btnWrap" role="presentation" data-ref="btnWrap" unselectable="on"><span class="x-btn-button x-btn-button-gw-top-menu-toolbar-small x-btn-text x-btn-button-center " id="TabBar:ContactTab-btnEl" role="presentation" data-ref="btnEl" unselectable="on"><span class="x-btn-icon-el x-btn-icon-el-gw-top-menu-toolbar-small " id="TabBar:ContactTab-btniconEl" role="presentation" data-ref="btniconEl" unselectable="on"></span><span class="x-btn-inner x-btn-inner-gw-top-menu-toolbar small" id="TabBar:ContactTab-btninnerEl" data-ref="btninnerEl" unselectable="on"><span class="g-underlined">C</span>ontact</span></span></span></a> | TabBar:ContactTab |
| 19 | x-btn-wrap x-btn-wrap-gw-top-menu-toolbar-small x-btn-split x-btn-split-right | | <span class="x-btn-wrap x-btn-wrap-gw-top-menu-toolbar-small x-btn-split x-btn-split-right" id="TabBar:ContactTab-btnWrap" role="presentation" data-ref="btnWrap" unselectable="on"><span class="x-btn-button x-btn-button-gw-top-menu-toolbar-small x-btn-text x-btn-button-center " id="TabBar:ContactTab-btnEl" role="presentation" data-ref="btnEl" unselectable="on"><span class="x-btn-icon-el x-btn-icon-el-gw-top-menu-toolbar-small " id="TabBar:ContactTab-btniconEl" role="presentation" data-ref="btniconEl" unselectable="on"></span><span class="x-btn-inner x-btn-inner-gw-top-menu-toolbar-small" id="TabBar:ContactTab-btninnerEl" data-ref="btninnerEl" unselectable="on"><span class="g-underlined">C</span>ontact</span></span></span> | TabBar:ContactTab-btnWrap |
| 20 | x-btn-button x-btn-button-gw-top-menu-toolbar-small x-btn-text x-btn-button-center | | <span class="x-btn-button x-btn-button-gw-top-menu-toolbar-small x-btn-text x-btn-button-center " id="TabBar:ContactTab-btnEl" role="presentation" data-ref="btnEl" unselectable="on"><span class="x-btn-icon-el x-btn-icon-el-gw-top-menu-toolbar-small " id="TabBar:ContactTab-btniconEl" role="presentation" data-ref="btniconEl" unselectable="on"></span><span class="x-btn-inner x-btn-inner-gw-top-menu-toolbar small" id="TabBar:ContactTab-btninnerEl" data-ref="btninnerEl" unselectable="on"><span class="g-underlined">C</span>ontact</span></span> | TabBar:ContactTab-btnEl |
| 21 | x-btn-icon-el x-btn-icon-el-gw-top-menu-toolbar-small | | <span class="x-btn-icon-el x-btn-icon-el-gw-top-menu-toolbar-small " "id="TabBar:ContactTab-btniconEl" role="presentation" "data-ref="btniconEl" unselecatble="on"></span> | TabBar:ContactTab-btniconEl |
| 22 | x-btn-inner x-btn-inner-gw-top-menu-toolbar-small | ontact | <span class="x-btn-inner x-btn-inner-gw-top-menu-toolbar-small" id="TabBar:ContactTab-btninnerEl" data-ref="btninnerEl" unselectable="on"><span class="g-underlined">C</span>ontact</span> | TabBar:ContactTab-btninnerEl |
| 23 | g-underlined | C | <span class="g-underlined">C</span> | |
| 24 | x-btn x-unselectable x-box-item x-toolbar-item x-btn-gw-top-menu-toolbar-small | | <a tabindex="−1" class="x-btn x-unselectable x-box-item x-toolbar-item x-btn-gw-top-menu-toolbar-small" id="TabBar:SearchTab" style="margin: 0px; left: 398px; top: 0px; right: auto;" hidefocus="on" unselectable="on" componentid="TabBar:SearchTab"><span class="x-btn-wrap x-btn-wrap-gw-top-menu toolbar-small x-btn-split x-btn-split-right" id="TabBar:SearchTab-btnWrap" role="presentation" data-ref="btnWrap" unselectable="on"><span class="x-btn-button x-btn-button-gw-top-menu-toolbar-small x-btn-text x-btn-button-center " id="TabBar:SearchTab-btnEl" role="presentation" data-ref="btnEl" unselectable="on"><span class="x-btn-icon-el | TabBar:SearchTab |

TABLE 2B-continued

Example Object Repository - Part 2 of 2

| ID | classname | innertext | outertext | id |
|---|---|---|---|---|
|  |  |  | x-btn-icon-el-gw-top-menu-toolbar-small " id="TabBar:SearchTab-btniconEl" role="presentation" data-ref="btniconEl" unselectable="on"></span><span class="x-btn-inner x-btn-inner-gw-top-menu-toolbar small" id="TabBar:SearchTab-btninnerEl" data-ref="btninnerEl" unselectable="on">Searc<span class="g-underlined">h</span></span></span></a> |  |
| 25 | x-btn-wrap x-btn-wrap-gw-top-menu-toolbar-small x-btn-split x-btn-split-right |  | <span class="x-btn-wrap x-btn-wrap-gw-top-menu-toolbar-small x-btn-split x-btn-split-right" id="TabBar:SearchTab-btnWrap" role="presentation" data-ref="btnWrap" unselectable="on"><span class="x-btn-button x-btn-button-gw-top-menu-toolbar-small x-btn-text x-btn-button-center " id="TabBar:SearchTab-btnEl" role="presentation" data-ref="btnEl" unselectable="on"><span class="x-btn-icon-el x-btn-icon-el-gw-top-menu-toolbar-small " id="TabBar:DesktopTab-btniconEl" role="presentation" data-ref="btniconEl" unselectable="on"></span><span class="x-btn-inner x-btn-inner-gw-top-menu-toolbar-small" id="TabBar:SearchTab-btninnerEl" data-ref="btninnerEl" unselectable="on">Searc<span class="g-underlined">h</span></span></span> | TabBar:SearchTab-btnWrap |
| 26 | x-btn-button x-btn-button-gw-top-menu-toolbar-small x-btn-text x-btn-button-center |  | <span class="x-btn-button x-btn-button-gw-top-menu-toolbar-small x-btn-text x-btn-button-center " id="TabBar:SearchTab-btnEl" role="presentation" data-ref="btnEl" unselectable="on"><span class="x-btn-icon-el x-btn-icon-el-gw-top-menu-toolbar-small " id="TabBar:SearchTab-btniconEl" role="presentation" data-ref="btniconEl" unselectable="on"></span><span class="x-btn-inner x-btn-inner-gw-top-menu-toolbar small" id="TabBar:SearchTab-btninnerEl" data-ref="btninnerEl" unselectable="on">Searc<span class="g-underlined">h</span>top</span></span> | TabBar:SearchTab-btnEl |
| 27 | x-btn-icon-el x-btn-icon-el-gw-top-menu-toolbar-small |  | <span class="x-btn-icon-el x-btn-icon-el-gw-top-menu-toolbar-small " id="TabBar:SearchTab-btniconEl" role="presentation" data-ref="btniconEl" unselecatble="on"></span> | TabBar:SearchTab-btniconEl |
| 28 | x-btn-inner x-btn-inner-gw-top-menu-toolbar-small | Searc | <span class="x-btn-inner x-btn-inner-gw-top-menu-toolbar-small" id="TabBar:SearchTab-btninnerEl" data-ref="btninnerEl" unselectable="on">Searc<span class="g-underlined">h</span></span> | TabBar:SearchTab-btninnerEl |
| 29 | g-underlined | h | <span class="g-underlined">h</span> |  |
| 30 | x-btn x-unselectable x-box-item x-toolbar-item x-btn-gw-top-menu-toolbar-small |  | <a tabindex="-1" class="x-btn x-unselectable x-box-item x-toolbar-item x-btn-gw-top-menu-toolbar-small" id="TabBar:TeamTab" style="margin: 0px; left: 493px; top: 0px; right: auto;" hidefocus="on" unselectable="on" componentid="TabBar:TeamTab"><span class="x-btn-wrap x-btn-wrap-gw-top-menu-toolbar-small" id="TabBar:TeamTab-btnWrap" role="presentation" data-ref="btnWrap" unselectable="on"><span class="x-btn-button x-btn-button-gw-top-menu-toolbar-small x-btn-text x-btn-button-center " id="TabBar:TeamTab-btnEl" role="presentation" data-ref="btnEl" unselectable="on"><span class="x-btn-icon-el x-btn-icon-el-gw-top-menu-toolbar-small " id="TabBar:TeamTab-btniconEl" role="presentation" data-ref="btniconEl" unselectable="on"></span><span class="x-btn-inner x-btn-inner-gw-top-menu-toolbar-small" id="TabBar:TeamTab-btninnerEl" data-ref="btninnerEl" unselectable="on"><span class="g-underlined">T</span>eam</span></span></a> | TabBar:TeamTab |
| 31 | x-btn-wrap x-btn-wrap-gw-top-menu-toolbar-small |  | <span class="x-btn-wrap x-btn-wrap-gw-top-menu-toolbar-small" id="TabBar:TeamTab-btnWrap" role="presentation" data-ref="btnWrap" unselectable="on"><span class="x-btn-button x-btn-button-gw-top-menu-toolbar-small x-btn-text x-btn-button-center " id="TabBar:TeamTab-btnEl" role="presentation" data-ref="btnEl" unselectable="on"><span class="x-btn-icon-el | TabBar:TeamTab btnWrap |

TABLE 2B-continued

Example Object Repository - Part 2 of 2

| ID | classname | innertext | outertext | id |
|---|---|---|---|---|
| | | | x-btn-icon-el-gw-top-menu-toolbar-small " id="TabBar:TeamTab-btniconEl" role="presentation" data-ref="btniconEl" unselectable="on"></span><span class="x-btn-inner x-btn-inner-gw-top-menu-toolbar-small" id="TabBar:TeamTab-btninnerEl" data-ref="btninnerEl" unselectable="on"><span class="g-underlined">T</span>eam</span></span> | |
| 32 | x-btn-button x-btn button-gw-top-menu toolbar-small x-btn-text x-btn-button-center | | <span class="x-btn-button x-btn-button-gw-top-menu-toolbar-small x-btn-text x-btn-button-center " id="TabBar:TeamTab-btnEl" role="presentation" data-ref="btnEl" unselectable="on"><span class="x-btn-icon-el x-btn-icon-el-gw-top-menu-toolbar-small "id="TabBar:TeamTab-btniconEl" role="presentation" data-ref="btniconEl" unselectable="on"></span><span class="x-btn-inner x-btn-inner-gw-top-menu-toolbar small" id="TabBar:TeamTab-btninnerEl" data-ref="btninnerEl" unselectable="on"><span class="g-underlined">T</span>eam</span></span> | TabBar:TeamTab btnEl |
| 33 | x-btn-icon-el x-btn-icon-el-gw-top-menu-toolbar-small | | <span class="x-btn-icon-el x-btn-icon-el-gw-top-menu-toolbar-small " id="TabBar:TeamTab-btniconEl" role="presentation" data-ref="btniconEl" unselectable="on"></span> | TabBar:TeamTab btniconEl |
| 34 | x-btn-inner x-btn-inner-gw-top-menu-toolbar-small | eam | <span class="x-btn-inner x-btn-inner-gw-top-menu-toolbar-small" id="TabBar:TeamTab-btninnerEl" data-ref="btninnerEl" unselectable="on"><span class="g-underlined">T</span>eam</span> | TabBar:TeamTab btninnerEl |
| 35 | g-underlined | T | <span class="g-underlined">T</span> | |
| 36 | x-btn x-unselectable x-box-item x-toolbar-item x-btn-gw-top-menu-toolbar-small | | <a tabindex="−1" class="x-btn x-unselectable x-box-item x-toolbar-item x-btn-gw-top-menu-toolbar-small" id="TabBar:AdminTab" style="margin: 0px; left: 562px; top: 0px; right: auto;" hidefocus="on" unselectable="on" componentid="TabBar:AdminTab"><span class="x-btn-wrap x-btn-wrap-gw-top-menu toolbar-small x-btn-split x-btn-split-right" id="TabBar:AdminTab-btnWrap" role="presentation" data-ref="btnWrap" unselectable="on"><span class="x-btn-button x-btn-button-gw-top-menu-toolbar-small x-btn-text x-btn-button-center " id="TabBar:AdminTab-btnEl" role="presentation" data-ref="btnEl" unselectable="on"><span class="x-btn-icon-el x-btn-icon-el-gw-top-menu-toolbar-small " id="TabBar:AdminTab-btniconEl" role="presentation" data-ref="btniconEl" unselectable="on"></span><span class="x-btn-inner x-btn-inner-gw-top-menu-toolbar small" id="TabBar:AdminTab-btninnerEl" data-ref="btninnerEl" unselectable="on">Administration</span></span></span></a> | TabBar:AdminTab |
| 37 | x-btn-wrap x-btn-wrap-gw-top-menu-toolbar-small x-btn-split x-btn-split-right | | <span class="x-btn-wrap x-btn-wrap-gw-top-menu-toolbar-small x-btn-split x-btn-split-right" id="TabBar:AdminTab-btnWrap" role="presentation" data-ref="btnWrap" unselectable="on"><span class="x-btn-button x-btn-button-gw-top-menu-toolbar-small x-btn-text x-btn-button-center" id="TabBar:AdminTab-btnEl" role="presentation" data-ref="btnEl" unselectable="on"><span class="x-btn-icon-el x-btn-icon-el-gw-top-menu-toolbar-small "id="TabBar:AdminTab-btniconEl" role="presentation" data-ref="btniconEl" unselectable="on"></span><span class="x-btn-inner x-btn-inner-gw-top-menu-toolbar-small" id="TabBar:AdminTab-btninnerEl" data-ref="btninnerEl" unselectable="on">Administration</span></span></span> | TabBar:AdminTab btnWrap |

TABLE 2B-continued

Example Object Repository - Part 2 of 2

| ID | classname | innertext | outertext | id |
|---|---|---|---|---|
| 38 | x-btn-button x-btn-button-gw-top-menu-toolbar-small x-btn-text x-btn-button-center | | <span class="x-btn-button x-btn-button-gw-top-menu-toolbar-small x-btn-text x-btn-button-center " id="TabBar:AdminTab-btnEl" role="presentation" data-ref="btnEl" unselectable="on"><span class="x-btn-icon-el x-btn-icon-el-gw-top-menu-toolbar-small " id="TabBar:AdminTab-btniconEl" role="presentation" data-ref="btniconEl" unselectable="on"></span><span class="x-btn-inner x-btn-inner-gw-top-menu-toolbar small" id="TabBar:AdminTab-btninnerEl" data-ref="btninnerEl" unselectable="on">Adminisrtation</span></span> | TabBar:AdminTab btnEl |
| 39 | x-btn-icon-el x-btn-icon-el-gw-top-menu-toolbar-small | | <span class="x-btn-icon-el x-btn-icon-el-gw-top-menu-toolbar-small " id="TabBar:AdminTab-btniconEl" role="presentation" data-ref="btniconEl" unselecatble="on"></span> | TabBar:AdminTab btniconEl |
| 40 | x-btn-inner x-btn-inner-gw-top-menu-toolbar-small | Adminis-tration | <span class="x-btn-inner x-btn-inner-gw-top-menu-toolbar-small" id="TabBar:AdminTab-btninnerEl" data-ref="btninnerEl" unselectable="on">Administration</span> | TabBar:AdminTab btninnerEl |
| 41 | x-btn g-no-menu-icon x-unselectable x-box-item x-toolbar-item x-btn-plain-toolbar-small x-item-disabled x-btn-disabled | | <a tabindex="−1" class="x-btn g-no-menu-icon x-unselectable x-box-item x-toolbar-item x-btn-plain-toolbar-small x-item-disabled x-btn-disabled" id="TabBar:UnsavedWorkTabBarLink" style="margin: 0px; left: 0px; top: 3px; right: auto;" hidefocus="on" unselectable="on" componentid="TabBar:UnsavedWorkTabBarLink" data-qtip="UnsavedWork"><span class="x-btn-wrap x-btn-wrap-plain-toolbar-small " id="TabBar:UnsavedWorkTabBarLink-btnWrap" role="presentation" data-ref="btnWrap" unselectable="on"><span class="x-btn-button x-btn-button-plain-toolbar-small x-btn-no-text x-btn-icon x-btn-icon-left x-btn-button-center " id="TabBar:UnsavedWorkTabBarLink-btnEl" role="presentation" data-ref="btnEl" unselectable="on"><span class="x-btn-icon-el x-btn-icon-el-plain-toolbar-small g-unsavedwork-icon " id="TabBar:UnsavedWorkTabBarLink-btniconEl" role="presentation" data-ref="btniconEl" unselectable="on"> </span><span class="x-btn-inner x-btn-inner-plain-toolbar-small" id="TabBar:UnsavedWorkTabBarLink-btninnerEl" data-ref="btninnerEl" unselectable="on"> </span></span></span></a> | TabBar:UnsavedWorkTabBarLink |
| 42 | x-btn-wrap x-btn-wrap-plain-toolbar-small | | <span class="x-btn-wrap x-btn-wrap-plain-toolbar-small" id="TabBar:UnsavedWorkTabBarLink-btnWrap" role="presentation" data-ref="btnWrap" unselectable="on"><span class="x-btn-button x-btn-button-plain-toolbar-small x-btn-no-text x-btn-icon x-btn-icon-left x-btn-button-center " id="TabBar:UnsavedWorkTabBarLink-btnEl" role="presentation" data-ref="btnEl" unselectable="on"><span class="x-btn-icon-el x-btn-icon-el-plain-toolbar-small g-unsavedwork-icon " id="TabBar:UnsavedWorkTabBarLink-btniconEl" role="presentation" data-ref="btniconEl" unselectable="on"> </span><span class="x-btn-inner x-btn-inner-plain-toolbar-small" id="TabBar:UnsavedWorkTabBarLink-btninnerEl" data-ref="btninnerEl" unselectable="on">nbsp;</span></span></span> | TabBar:UnsavedWorkTabBarLink-btnWrap |
| 43 | x-btn-button x-btn-button-plain-toolbar-small x-btn-no-text x-btn-icon x-btn-icon-left x-btn-button-center | | <span class="x-btn-button x-btn-button-plain-toolbar-small x-btn-no-text x-btn-icon x-btn-icon-left x-btn-button-center " id="TabBar:UnsavedWorkTabBarLink-btnEl" role="presentation" data-ref="btnEl" unselectable="on"><span class="x-btn-icon-el x-btn-icon-el-plain-toolbar-small g-unsavedwork-icon " id="TabBar:UnsavedWorkTabBarLink-btniconEl" role="presentation" data-ref="btniconEl" unselectable="on"> </span><span class="x-btn-inner x-btn-inner-plain-toolbar-small" id="TabBar:UnsavedWorkTabBarLink-btninnerEl" data-ref="btninnerEl" unselectable="on"> </span></span> | TabBar:UnsavedWorkTabBarLink-btnEl |

TABLE 2B-continued

Example Object Repository - Part 2 of 2

| ID | classname | innertext | outertext | id |
|---|---|---|---|---|
| 44 | x-btn-icon-el x-btn-icon-el-plain-toolbar-small g-unsavedwork-icon | | <span class="x-btn-icon-el x-btn-icon-el-plain-toolbar-small g-unsavedwork-icon " id="TabBar:UnsavedWorkTabBarLink-btniconEl" role="presentation" data-ref="btniconEl" unselectable="on">&nbsp;</span> | TabBar:UnsavedWorkTabBarLink btniconEl |
| 45 | x-btn-inner x-btn-inner-plain-toolbar-small | | <span class="x-btn-inner x-btn-inner-plain-toolbar-small" id="TabBar:UnsavedWorkTabBarLink-btninnerEl" role="presentation" data-ref="btninnerEl" unselectable="on">&nbsp;</span> | TabBar:UnsavedWorkTabBarLink btniconEl |
| 46 | x-btn x-unselectable x-box-item x-toolbar-item x-btn-plain-toolbar-small | | <a tabindex="−1" class="x-btn x-unselectable x-box-item x-toolbar-item x-btn-plain-toolbar-small"id="TabBar:ProfilerHiddenLink" style="display:none;" hidefocus="on" unselectable="on" componentid="TabBar:ProfilerHiddenLink"><span class="x-btn-wrap x-btn-wrap-plain-toolbar-small" id="TabBar:ProfilerHiddenLink-btnWrap" role="presentation" data-ref="btnWrap" unselectable="on"><span class="x-btn-button x-btn-button-plain-toolbar-small x-btn-no-text x-btn-button-center" id="TabBar:ProfilerHiddenLink-btnEl" role="presentation" data-ref="btnEl" unselectable="on"><span class="x-btn-icon-el x-btn-icon-el-plain-toolbar-small " id="TabBar:ProfilerHiddenLink-btniconEl" role="presentation" data-ref="btniconEl" unselectable="on"></span><span class="x-btn-inner x-btn-inner-plain-toolbar-small" id="TabBar:ProfilerHiddenLink-btninnerEl" data-ref="btninnerEl" unselectable="on">&nbsp;</span></span></span></a> | TabBar:ProfilerHiddenLink |
| 47 | x-btn-wrap x-btn-wrap-plain-toolbar-small | | <span class="x-btn-wrap x-btn-wrap-plain-toolbar-small" id="TabBar:ProfilerHiddenLink-btnWrap" role="presentation" data-ref="btnWrap" unselectable="on"><span class="x-btn-button x-btn-button-plain-toolbar-small x-btn-no-text x-btn-button-center " id="TabBar:ProfilerHiddenLink-btnEl" role="presentation" data-ref="btnEl" unselectable="on"><span class="x-btn-icon-el x-btn-icon-el-plain-toolbar-small " id="TabBar:ProfilerHiddenLink-btniconEl" role="presentation" data-ref="btniconEl" unselectable="on"></span><span class="x-btn-inner x-btn-inner-plain-toolbar-small" id="TabBar:ProfilerHiddenLink-btninnerEl" data-ref="btninnerEl" unselectable="on">&nbsp;</span></span></span> | TabBar:ProfilerHiddenLink btnWrap |
| 48 | x-btn-button x-btn-button-plain-toolbar-small x-btn-no-text x-btn-button-center | | <span class="x-btn-button x-btn-button-plain-toolbar-small x-btn-no-text x-btn-button-center " id="TabBar:ProfilerHiddenLink-btnEl" role="presentation" data-ref="btnEl" unselectable="on"><span class="x-btn-icon-el x-btn-icon-el-plain-toolbar-small " id="TabBar:ProfilerHiddenLink-btniconEl" role="presentation" data-ref="btniconEl" unselectable="on"></span><span class="x-btn-inner x-btn-inner-plain-toolbar-small" id="TabBar:ProfilerHiddenLink-btninnerEl" data-ref="btninnerEl" unselectable="on">&nbsp;</span></span> | TabBar:ProfilerHiddenLink btnEl |
| 49 | x-btn-icon-el x-btn-icon-el-plain- | | <span class="x-btn-icon-el x-btn-icon-el-plain-toolbar-small " id="TabBar:ProfilerHiddenLink-btniconEl" role="presentation" data-ref="btniconEl" unselecatble="on"></span> | TabBar:ProfilerHiddenLink btniconEl |
| 50 | x-btn-inner x-btn-inner-plain-toolbar-small | | <span class="x-btn-inner x-btn-inner-plain-toolbar-small" id="TabBar:ProfilerHiddenLink-btninnerEl" data-ref="btninnerEl" unselecatble="on">&nbsp;</span> | TabBar:ProfilerHiddenLink btninnerl |
| 51 | x-btn x-unselectable x-box-item x-toolbar-item x-btn-plain-toolbar-small | | <a tabindex="−1" class="x-btn x-unselectable x-box-item x-toolbar-item x-btn-plain-toolbar-small "id="TabBar:InternalToolsHiddenLink" style="display: none;" hidefocus="on" unselectable="on" componentid="TabBar:InternalToolsHiddenLink"><span class="x-btn-wrap x-btn-wrap-plain-toolbar-small" id="TabBar:InternalToolsHiddenLink-btnWrap" role="presentation" data-ref="btnWrap" unselectable="on"><span class="x-btn-button x-btn-button-plain-toolbar-small | TabBar:InternalToolsHiddenLink |

TABLE 2B-continued

Example Object Repository - Part 2 of 2

| ID | classname | innertext | outertext | id |
|---|---|---|---|---|
|  |  |  | x-btn-no-text x-btn-button-center " id="TabBar:InternalToolsHiddenLink-btnEl" role="presentation" data-ref="btnEl" unselectable="on"><span class="x-btn-icon-el x-btn-icon-el-plain-toolbar-small " id="TabBar:InternalToolsHiddenLink-btniconEl" role="presentation" data-ref="btniconEl" unselectable="on"></span><span class="x-btn-inner x-btn-inner-plain-toolbar-small" id="TabBar:InternalToolsHiddenLink-btninnerEl" data-ref="btninnerEl" unselectable="on"> </span></span></span></a> |  |
| 52 | x-btn-wrap x-btn-wrap-plain-toolbar-small |  | <span class="x-btn-wrap x-btn-wrap-plain-toolbar-small " id="TabBar:InternalToolsHiddenLink-btnWrap" role="presentation" data-ref="btnWrap" unselectable="on"><span class="x-btn-button x-btn-button-plain-toolbar-small x-btn-no-text x-btn-button-center " id="TabBar:InternalToolsHiddenLink-btnEl" role="presentation" data-ref="btnEl" unselectable="on"><span class="x-btn-icon-el x-btn-icon-el-plain-toolbar-small " id="TabBar:InternalToolsHiddenLink-btniconEl" role="presentation" data-ref="btniconEl" unselectable="on"></span><span class="x-btn-inner x-btn-inner-plain-toolbar-small" id="TabBar:InternalToolsHiddenLink-btninnerEl" data-ref="btninnerEl" unselectable="on"> </span></span></span> | TabBar:InternalToolsHiddenLink btnWrap |
| 53 | x-btn-button x-btn-button-plain-toolbar-small x-btn-no-text x-btn-button-center |  | <span class="x-btn-button x-btn-button-plain-toolbar-small x-btn-no-text x-btn-button-center " id="TabBar:InternalToolsHiddenLink-btnEl" role="presentation" data-ref="btnEl" unselectable="on"><span class="x-btn-icon-el x-btn-icon-el-plain-toolbar-small " id="TabBar:InternalToolsHiddenLink-btniconEl" role="presentation" data-ref="btniconEl" unselectable="on"></span><span class="x-btn-inner x-btn-inner-plain-toolbar-small" id="TabBar:InternalToolsHiddenLink-btninnerEl" data-ref="btninnerEl" unselectable="on"> </span></span> | TabBar:InternalToolsHiddenLink-btnEl |
| 54 | x-btn-icon-el x-btn-icon-el-plain-toolbar-small |  | <span class="x-btn-icon-el x-btn-icon-el-plain-toolbar-small " id="TabBar:InternalToolsHiddenLink-btniconEl" role="presentation" data-ref="btniconEl" unselecatble="on"></span> | TabBar:InternalToolsHiddenLink-btniconEl |
| 55 | x-btn-inner x-btn-inner-plain-toolbar-small |  | <span class="x-btn-inner x-btn-inner-plain-toolbar-small" id="TabBar:InternalToolsHiddenLink-btninnerEl" data-ref="btninnerEl" unselectable="on"> </span> | TabBar:InternalToolsHiddenLink-btninnerEl |

In some implementations, a logical name of an object matches the name defined in that object's "properties" (e.g., within the Object Repository). Dynamic content that has been scraped from a web page (e.g., using JSoup) can be stored as "Object Capture." Parsing of the Object Capture data can be based on the property or properties of the missing UI object. Properties of current UI objects, and their associated attributes (e.g., tag name, location, size, color, class name, innertext, outertext, etc.), can be extracted based on data stored in the Object Repository. In some implementations, the Object Repository includes a Configuration Properties File, which may be organized in columns, as shown by the following example code snippet:

```
                    config.properties
1 filepath=C:\\Vikram\\Self_Healing\\object_repository
2 columnNames=ID,Logical_name,tagName,absLocation,size,color,name,
href,alt_text,classname,innertext,outertext,id
3 driverPath=C:\\Vikram\\Docs\\MicrosoftWebDriver.exe
4
```

Each column name in the Object Repository can (1) describe a configuration object attribute (each of which is also stored in the Configuration Properties File), and (2) can be assigned a weight. Associations between the columns and the assigned weights can be maintained, for example, in a "Weightage Properties File." In some such implementations, the Object Repository column names match the logical names in the weightage properties file. An example definition of a Weightage Properties File is shown by the following code snippet:

```
                    weightage.properties
1 tagName = 2
2 absLocation = 1
3 size = 1
4 color = 1
5 name = 3
```

-continued

| weightage.properties |
|---|
| 6 href = 5 |
| 7 alt_text = 1 |
| 8 classname = 4 |
| 9 innertext = 1 |
| 10 outertext = 1 |
| 11 id = 5 |
| 12 over_all = 80| |

Example data resulting from the object comparisons is shown in Table 3:

TABLE 3

Example Object Comparison Data

| ID | tagName | absLocation | size | color | name | href | alt_text | classname | innertext | outertext | id |
|---|---|---|---|---|---|---|---|---|---|---|---|
| 2 | 100 | 100 | 100 | 100 | 100 | 100 | 100 | 100 | 100 | 100 | 100 |
| 3 | 25 | 75 | 62 | 0 | 100 | 100 | 100 | 35 | 100 | 72 | 68 | 69 |
| 4 | 25 | 75 | 62 | 0 | 100 | 100 | 100 | 32 | 100 | 54 | 73 | 69 |
| 5 | 25 | 62 | 62 | 0 | 100 | 100 | 0 | 43 | 100 | 16 | 62 | 61 |
| 6 | 25 | 75 | 62 | 0 | 100 | 100 | 100 | 42 | 0 | 18 | 60 | 61 |
| 7 | 25 | 62 | 50 | 0 | 100 | 100 | 14 | 9 | 0 | 3 | 0 | 39 |
| 8 | 100 | 75 | 87 | 0 | 100 | 100 | 0 | 78 | 100 | 89 | 58 | 77 |
| 9 | 25 | 75 | 62 | 0 | 100 | 100 | 0 | 35 | 100 | 66 | 40 | 59 |
| 10 | 25 | 75 | 62 | 0 | 100 | 100 | 0 | 32 | 100 | 48 | 43 | 58 |
| 11 | 25 | 62 | 62 | 0 | 100 | 100 | 0 | 43 | 100 | 16 | 37 | 56 |
| 12 | 25 | 75 | 62 | 0 | 100 | 100 | 0 | 42 | 0 | 14 | 35 | 51 |
| 13 | 100 | 75 | 87 | 0 | 100 | 100 | 0 | 78 | 100 | 92 | 58 | 77 |
| 14 | 25 | 75 | 62 | 0 | 100 | 100 | 0 | 35 | 100 | 69 | 37 | 58 |
| 15 | 25 | 75 | 62 | 0 | 100 | 100 | 0 | 32 | 100 | 51 | 40 | 58 |
| 16 | 25 | 62 | 62 | 0 | 100 | 100 | 0 | 43 | 100 | 16 | 34 | 56 |
| 17 | 25 | 75 | 62 | 0 | 100 | 100 | 0 | 42 | 0 | 17 | 33 | 51 |
| 18 | 25 | 62 | 50 | 0 | 100 | 100 | 0 | 9 | 0 | 3 | 0 | 38 |
| 19 | 100 | 75 | 87 | 0 | 100 | 100 | 0 | 78 | 100 | 92 | 58 | 77 |
| 20 | 25 | 75 | 62 | 0 | 100 | 100 | 0 | 35 | 100 | 69 | 40 | 59 |
| 21 | 25 | 75 | 62 | 0 | 100 | 100 | 0 | 32 | 100 | 51 | 43 | 58 |
| 22 | 25 | 62 | 62 | 0 | 100 | 100 | 0 | 43 | 100 | 16 | 37 | 56 |
| 23 | 25 | 75 | 62 | 0 | 100 | 100 | 0 | 42 | 0 | 17 | 35 | 51 |
| 24 | 25 | 62 | 50 | 0 | 100 | 100 | 0 | 9 | 0 | 3 | 0 | 38 |
| 25 | 100 | 75 | 87 | 0 | 100 | 100 | 14 | 78 | 100 | 93 | 64 | 79 |
| 26 | 25 | 75 | 62 | 0 | 100 | 100 | 14 | 35 | 100 | 69 | 41 | 60 |
| 27 | 25 | 75 | 62 | 0 | 100 | 100 | 14 | 32 | 100 | 51 | 45 | 59 |
| 28 | 25 | 62 | 62 | 0 | 100 | 100 | 0 | 43 | 100 | 16 | 38 | 56 |
| 29 | 25 | 75 | 62 | 0 | 100 | 100 | 14 | 42 | 0 | 17 | 37 | 52 |
| 30 | 25 | 62 | 50 | 0 | 100 | 100 | 0 | 9 | 0 | 3 | 0 | 38 |
| 31 | 100 | 75 | 87 | 0 | 100 | 100 | 14 | 78 | 100 | 90 | 64 | 79 |
| 32 | 25 | 75 | 62 | 0 | 100 | 100 | 14 | 39 | 100 | 66 | 45 | 61 |
| 33 | 25 | 75 | 62 | 0 | 100 | 100 | 14 | 32 | 100 | 51 | 40 | 58 |
| 34 | 25 | 62 | 62 | 0 | 100 | 100 | 0 | 43 | 100 | 16 | 37 | 56 |
| 35 | 25 | 75 | 62 | 0 | 100 | 100 | 14 | 42 | 0 | 17 | 36 | 52 |
| 36 | 25 | 62 | 50 | 0 | 100 | 100 | 0 | 9 | 0 | 3 | 0 | 38 |
| 37 | 100 | 75 | 87 | 0 | 100 | 100 | 21 | 78 | 100 | 89 | 58 | 78 |
| 38 | 25 | 75 | 62 | 0 | 100 | 100 | 21 | 35 | 100 | 66 | 39 | 60 |
| 39 | 25 | 75 | 62 | 0 | 100 | 100 | 21 | 32 | 100 | 48 | 38 | 58 |
| 40 | 25 | 62 | 62 | 0 | 100 | 100 | 0 | 43 | 100 | 16 | 31 | 55 |
| 41 | 25 | 75 | 62 | 0 | 100 | 100 | 21 | 42 | 0 | 14 | 30 | 51 |
| 42 | 100 | 55 | 50 | 0 | 100 | 100 | 0 | 59 | 100 | 70 | 42 | 67 |
| 43 | 25 | 55 | 62 | 0 | 100 | 100 | 0 | 30 | 100 | 52 | 33 | 55 |
| 44 | 25 | 55 | 62 | 0 | 100 | 100 | 0 | 30 | 100 | 42 | 35 | 55 |
| 45 | 25 | 55 | 62 | 0 | 100 | 100 | 0 | 32 | 100 | 17 | 31 | 53 |
| 46 | 25 | 62 | 62 | 0 | 100 | 100 | 0 | 34 | 100 | 14 | 30 | 54 |
| 47 | 100 | 62 | 62 | 0 | 100 | 100 | 0 | 69 | 100 | 72 | 31 | 68 |
| 48 | 25 | 55 | 62 | 0 | 100 | 100 | 0 | 30 | 100 | 56 | 33 | 55 |
| 49 | 25 | 62 | 62 | 0 | 100 | 100 | 0 | 31 | 100 | 42 | 29 | 54 |
| 50 | 25 | 62 | 62 | 0 | 100 | 100 | 0 | 34 | 100 | 15 | 28 | 53 |
| 51 | 25 | 62 | 62 | 0 | 100 | 100 | 0 | 34 | 100 | 14 | 27 | 53 |
| 52 | 100 | 62 | 62 | 0 | 100 | 100 | 0 | 69 | 100 | 70 | 30 | 68 |
| 53 | 25 | 55 | 62 | 0 | 100 | 100 | 0 | 30 | 100 | 55 | 31 | 55 |
| 54 | 25 | 62 | 62 | 0 | 100 | 100 | 0 | 31 | 100 | 42 | 27 | 54 |
| 55 | 25 | 62 | 62 | 0 | 100 | 100 | 0 | 34 | 100 | 16 | 27 | 53 |
| 56 | 25 | 62 | 62 | 0 | 100 | 100 | 0 | 34 | 100 | 14 | 26 | 53 |

Although shown and described above to include or be embodied by a spreadsheet, an "object repository," as used herein, can alternatively or additionally refer to a database, data table, or any other type of file capable of storing and/or managing object data.

In some embodiments, the self-healing tool includes a software module configured to identify replacement UI objects using one or more of data analytics, machine learning, and image cognition. Some implementations of the self-healing can also integrate with one or more other tools, testing processes, and/or automation frameworks. The self-healing tool can be designed for use in desktop applications and/or mobile applications.

Example Self-Healing Process for a Modified Web Page

In some embodiments, a method of automatic script remediation includes searching for a user interface (UI) object of a second version of a web page that preceded a first version of the web page, during execution of a test automation script with respect to the first version of the web page. In response to failing to identify the UI object of the second version of the web page within the first version of the web page, a self-healing tool compares data of a plurality of UI objects of the first version of the web page with UI object data associated with the second version of the web page. The self-healing tool then calculates similarity scores (e.g., using Cosine similarity, a semantic-based similarity, or an edit distance, such as a Levenshtein edit distance) based on the data of the plurality of UI objects and the UI object data associated with the second version of the web page, and identifies a UI object of the plurality of UI objects of the first version of the web page having a highest similarity score of the calculated similarity scores. The self-healing tool then automatically modifies the test automation script to produce a modified test automation script such that execution of the modified test automation script with respect to the first version of the web page includes searching for the UI object of the first version of the web page having the highest similarity score in lieu of searching for the UI object of the second version of the web page. The method can also include updating the UI object data associated with the second version of the web page in response to the identification of the UI object of the plurality of UI objects of the first version of the web page having the highest similarity score. Automatically modifying the test automation script can include replacing a representation of the UI object of the second version of the web page with a representation of the UI object of the first version of the web page having the highest similarity score.

In some embodiments, a method of automatic script remediation includes searching for a UI object of a second version of a web page that preceded a first version of the web page, during execution of a test automation script with respect to the first version of the web page. A representation of the UI object of the second version of the web page is stored in a repository and referenced by the test automation script. In response to failing to identify UI object of the second version of the web page within the first version of the web page, a self-healing tool compares data of a plurality of UI objects of the first version of the web page with UI object data associated with the second version of the web page. The self-healing tool then calculates similarity scores (e.g., using Cosine similarity, a semantic-based similarity, or an edit distance, such as a Levenshtein edit distance) based on the data of the plurality of UI objects and the UI object data associated with the second version of the web page. The self-healing tool identifies a UI object of the plurality of UI objects of the first version of the web page having a highest similarity score of the calculated similarity scores, and automatically modifies the stored representation of the UI object of the second version of the web page to produce a modified object representation, such that execution of the test automation script after modification of the representation of the UI object of the second version of the web page includes searching for the UI object of the first version of the web page having the highest similarity score in lieu of searching for the UI object of the second version of the web page. The method can also include updating the UI object data associated with the second version of the web page in response to the identification of the UI object of the plurality of UI objects of the first version of the web page having the highest similarity score.

In some embodiments, a non-transitory processor-readable medium stores code that represents instructions to be executed by a processor. The code includes code to cause the processor to search for a UI object of a second version of a web page that preceded a first version of the web page, during execution of a test automation script with respect to the first version of the web page. The code also includes code to cause the processor, in response to failing to identify the UI object of the second version of the web page within the first version of the web page, to: (1) compare data of a plurality of UI objects of the first version of the web page with UI object data associated with the second version of the web page; (2) calculate similarity scores (e.g., using Cosine similarity, a semantic-based similarity, or an edit distance, such as a Levenshtein edit distance) based on the data of the plurality of UI objects and the UI object data associated with the second version of the web page; (3) identify a UI object of the plurality of UI objects of the first version of the web page having a highest similarity score of the calculated similarity scores; and (4) automatically modify one of the test automation script or an identifier of the UI object of the second version of the web page that is referenced by the test automation script, such that execution of the test automation script subsequent to the automatic modification includes searching for the UI object of the first version of the web page having the highest similarity score in lieu of searching for the UI object of the second version of the web page. The code can also include code to cause the processor to: update the UI object data associated with the second version of the web page in response to the identification of the UI object of the plurality of UI objects of the first version of the web page having the highest similarity score. In some embodiments, the automatically modifying is of the test automation script, and the automatically modifying includes replacing a representation of the UI object of the second version of the web page with a representation of the UI object of the first version of the web page having the highest similarity score.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. They are presented to assist in understanding and teach the embodiments.

It should be understood that they are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
during execution of a script, attempting to identify a first user interface (UI) object;
in response to failing to identify, at a first time, the first UI object:
(i) calculating a first plurality of similarity scores, each similarity score from the first plurality of similarity scores associated with a UI object from a plurality of UI objects, the calculating based on: (1) comparisons between properties of the plurality of UI objects and a plurality of historical properties associated with the first UI object, and (2) at least one weight,
(ii) identifying a second UI object, from the plurality of UI objects, based on the second UI object having a highest score from first plurality of similarity scores, and
(iii) automatically modifying the script to include a modified value such that subsequent execution of the script includes attempting to identify the second UI object instead of the first UI object; and
during the subsequent execution of the script, at a second time after the first time, and in response to an error triggered by the modified value:
iterating step (i) to produce a second plurality of similarity scores; and
blocking subsequent use of the second UI object when the second UI object has a highest score from the second plurality of similarity scores.

2. The method of claim 1, wherein the script is one of a test automation script or a robotics process automation script.

3. The method of claim 2, wherein the calculating the first plurality of similarity scores is performed according to a predetermined, configurable protocol.

4. The method of claim 1, wherein automatically modifying the script includes replacing a representation of the first UI object with a representation of the second UI object.

5. The method of claim 1, wherein the execution of the script is performed on a second version of a web page, the second version of the web page being different from an earlier, first version of the web page, the plurality of UI objects being included in the second version of the web page, and the first UI object is included in the first version of the web page.

6. The method of claim 1, wherein the execution of the script is performed on a second version of a web page, the second version of the web page being different from an earlier, first version of the web page, the plurality of UI objects being included in the second version of the web page, and the plurality of historical properties is further associated with the first version of the web page.

7. The method of claim 1, wherein each similarity score from the first plurality of similarity scores is uniquely associated with an associated UI object from the plurality of UI objects.

8. The method of claim 1, wherein the at least one weight is associated with at least one historical property from the plurality of historical properties associated with the first UI object.

9. The method of claim 1, wherein the subsequent execution of the script occurs automatically, without restarting the script.

10. The method of claim 1, wherein the automatically modifying is of the script, the method further comprising further modifying the script in response to failing to identify the second UI object during the subsequent execution.

11. The method of claim 1, wherein the at least one weight includes a user-customizable weight.

12. The method of claim 1, wherein the first UI object and each UI object from the plurality of UI objects have a common object type.

13. The method of claim 1, wherein the calculating the first plurality of similarity scores is further based on a hash map.

14. The method of claim 1, further comprising gathering the plurality of UI objects using web scraping, prior to calculating the first plurality of similarity scores.

15. A system, comprising:
a processor; and
a non-transitory processor-readable medium storing instructions to cause the processor to:
attempt to identify a first UI object, referenced by a script;
in response to failing to identify, at a first time, the first UI object:
(i) calculate a first plurality of similarity scores, each similarity score from the first plurality of similarity scores associated with a UI object from a plurality of UI objects, the calculating based on: (1) comparisons between properties of the plurality of UI objects and a plurality of historical properties associated with the first UI object, and (2) at least one weight,
(ii) identify a second UI object, from the plurality of UI objects, having a highest similarity score from the first plurality of similarity scores,
(iii) automatically modify the script to include a modified value, such that subsequent execution of the script includes identify the second UI object in lieu of the first UI object; and
during the subsequent execution of the script, at a second time after the first time, and in response to an error triggered by the modified value:
iterate step (i) to produce a second plurality of similarity scores; and
block subsequent use of the second UI object when the second UI object has a highest score from the second plurality of similarity scores.

16. The system of claim 15, wherein the script is one of a test automation script or a robotics process automation script.

17. The system of claim 16, wherein the instructions to cause the processor to calculate the first plurality of similarity scores include instructions to cause the processor to calculate the first plurality of similarity scores according to a predetermined, configurable protocol.

18. The system of claim 15, wherein instructions to cause the processor to calculate the first plurality of similarity scores include instructions to cause the processor to calculate the first plurality of similarity scores using one of a Levenshtein edit distance, a Cosine similarity, a machine learning model, or a semantic-based similarity.

19. The system of claim 15, wherein the subsequent execution of the script is performed on a second version of a web page, the second version of the web page being different from an earlier, first version of the web page, the plurality of UI objects being included in the second version of the web page, and the first UI object being included in the first version of the web page.

20. The system of claim 15, wherein the subsequent execution of the script is performed on a second version of a web page, the second version of the web page being different from an earlier, first version of the web page, the plurality of UI objects being included in the second version of the web page, and the plurality of historical properties being further associated with the first version of the web page.

21. A non-transitory processor-readable medium storing code representing instructions to be executed by a processor, the code comprising code to cause the processor to:
   attempt to identify a first UI object;
   in response to failing to identify, at a first time, the first UI object:
      (i) calculate a first plurality of similarity scores, each similarity score from the first plurality of similarity scores associated with a UI object from a plurality of UI objects, the calculating based on: (1) comparisons between properties of the plurality of UI objects and a plurality of historical properties associated with the first UI object, and (2) at least one weight,
      (ii) identify a second UI object, from the plurality of UI objects, having a highest similarity score from the first plurality of similarity scores, and
      (iii) automatically modify the script to include a modified value, such that execution of the script subsequent to the automatic modification includes identify the second UI object in lieu of the first UI object; and
   during the subsequent execution of the script, at a second time after the first time, and in response to an error triggered by the modified value:
      iterate step (i) to produce a second plurality of similarity scores; and
      block subsequent use of the second UI object when the second UI object has a highest score from the second plurality of similarity scores.

22. The medium of claim 21, wherein the script is one of a test automation script or a robotics process automation script.

23. The medium of claim 22, wherein the code further comprises code to cause the processor to:
   detect that the highest similarity score is less than a predetermined threshold value; and
   repeat (i) and (ii) in response to detecting that the highest similarity score is less than the predetermined threshold value.

24. The medium of claim 21, wherein calculating the plurality of similarity scores is performed using one of a Levenshtein edit distance, a Cosine similarity, a machine learning model, or a semantic-based similarity.

25. The medium of claim 21, wherein automatically modifying includes replacing a representation of the first UI object with a representation of the second UI object.

26. The medium of claim 21, wherein the execution of the script is performed on a second version of a web page, the second version of the web page being different from an earlier, first version of the web page, the plurality of UI objects being included in the second version of the web page, and the first UI object is included in the first version of the web page.

27. The medium of claim 21, wherein the execution of the script is performed on a second version of a web page, the second version of the web page being different from an earlier, first version of the web page, the plurality of UI objects being included in the second version of the web page, and the plurality of historical properties is further associated with the first version of the web page.

* * * * *